US012214584B2

(12) United States Patent
Hayakawa

(10) Patent No.: US 12,214,584 B2
(45) Date of Patent: Feb. 4, 2025

(54) PRINTING APPARATUS WITH DEVICE IN TRANSPORT PATH

(71) Applicant: SEIKO EPSON CORPORATION, Tokyo (JP)

(72) Inventor: Naoto Hayakawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 122 days.

(21) Appl. No.: 18/067,306

(22) Filed: Dec. 16, 2022

(65) Prior Publication Data

US 2023/0191808 A1 Jun. 22, 2023

(30) Foreign Application Priority Data

Dec. 17, 2021 (JP) ................................ 2021-204883

(51) Int. Cl.
*B41J 11/42* (2006.01)
*B41F 13/02* (2006.01)
(Continued)

(52) U.S. Cl.
CPC ............... *B41J 11/42* (2013.01); *B41F 13/02* (2013.01); *B41F 17/00* (2013.01); *B41J 2/01* (2013.01);
(Continued)

(58) Field of Classification Search
CPC . B41J 11/42; B41J 11/663; B41J 11/70; B41J 15/04; B41J 3/60; B41J 2/01;
(Continued)

(56) References Cited

U.S. PATENT DOCUMENTS

2014/0373775 A1* 12/2014 Koike ..................... B65C 11/04 118/46
2017/0282606 A1* 10/2017 Yatsunami ........... B41J 11/0095
(Continued)

FOREIGN PATENT DOCUMENTS

JP 2011-162314 A 8/2011
JP 2014-66618 A 4/2014

OTHER PUBLICATIONS

Non-Final Office Action mailed on Aug. 27, 2024, in U.S. Appl. No. 18/194,884, 12 pages.

*Primary Examiner* — Henok D Legesse
(74) *Attorney, Agent, or Firm* — WORKMAN NYDEGGER

(57) ABSTRACT

A printing apparatus includes: a transport roller configured to transport a medium through a transport path; a printing unit configured to perform printing on the medium transported by the transport roller through the transport path; an intermediate roller configured to transport again, to the transport path, the medium transported through an inversion path in a reverse direction to a transport direction of the medium to invert a front surface and a back surface of the medium, the inversion path including a branching point where the inversion path branches from the transport path at an upstream side of the transport roller in the transport direction, the inversion path merging with the transport path again at an upstream side of the branching point in the transport direction; a device disposed in the transport path and between the transport roller and the intermediate roller; a first driving device configured to drive the transport roller; and a second driving device configured to drive the intermediate roller, in which the intermediate roller includes an electromagnetic clutch mechanism.

6 Claims, 23 Drawing Sheets

(51) Int. Cl.

| | |
|---|---|
| ***B41F 17/00*** | (2006.01) |
| ***B41J 2/01*** | (2006.01) |
| ***B41J 3/44*** | (2006.01) |
| ***B41J 11/00*** | (2006.01) |
| ***B41J 11/66*** | (2006.01) |
| ***B41J 11/70*** | (2006.01) |
| ***B41J 15/04*** | (2006.01) |
| ***B41J 23/02*** | (2006.01) |
| ***B41J 29/393*** | (2006.01) |
| ***B65H 5/06*** | (2006.01) |
| ***B65H 15/00*** | (2006.01) |
| ***B65H 18/10*** | (2006.01) |
| *B41J 3/60* | (2006.01) |
| *B65H 20/02* | (2006.01) |

(52) U.S. Cl.

CPC ........... *B41J 3/445* (2013.01); *B41J 11/0045* (2013.01); *B41J 11/663* (2013.01); *B41J 11/70* (2013.01); *B41J 15/04* (2013.01); *B41J 23/02* (2013.01); *B41J 29/393* (2013.01); *B65H 5/06* (2013.01); *B65H 15/00* (2013.01); *B65H 15/004* (2020.08); *B65H 18/10* (2013.01); *B41J 3/60* (2013.01); *B65H 20/02* (2013.01)

(58) Field of Classification Search

CPC ........ B41J 3/445; B41J 11/0045; B41J 23/02; B41J 29/393; B65H 20/02; B65H 5/06; B65H 15/00; B65H 15/004; B65H 18/10; B41F 13/02; B41F 17/00

See application file for complete search history.

(56) References Cited

U.S. PATENT DOCUMENTS

| | | | | |
|---|---|---|---|---|
| 2022/0169051 | A1 * | 6/2022 | Yamaguchi | B65H 35/006 |
| 2023/0239456 | A1 | 7/2023 | Xiao | |

* cited by examiner

PRINTING APPARATUS WITH DEVICE IN TRANSPORT PATH

The present application is based on, and claims priority from JP Application Serial Number 2021-204883, filed on Dec. 17, 2021, the disclosure of which is hereby incorporated by reference herein in its entirety.

BACKGROUND

1. Technical Field

The present disclosure relates to a printing apparatus, and a method of controlling a printing apparatus.

2. Related Art

A printing apparatus is known, as described in JP-A-2014-66618. The printing apparatus includes a head configured to print an image on a sheet, and an imaging unit disposed downstream of the head and configured to capture an image of the sheet on which printing has been performed.

In addition, as described in JP-A-2011-162314, a printing apparatus is known. This printing apparatus includes a head configured to print an image on a sheet, a transport driving roller configured to transport the sheet toward the head, and an inverting roller disposed upstream of the transport driving roller and configured to transport the sheet toward the head.

However, in a case of the printing apparatus described in JP-A-2014-66618, the size of the printing apparatus increases due to the arrangement of the imaging unit. In this regard, in the printing apparatus described in JP-A-2011-162314, the imaging unit is disposed, for example, between a transport driving roller on the transport path and the inverting roller, which makes it possible to reduce the size of the printing apparatus.

However, in the case of the printing apparatus described in JP-A-2011-162314, the inverting roller is configured to always drive in a forward rotation. This leads to a problem in that an image of a sheet on which printing has been performed cannot be captured in a state in which the sheet on which printing has been performed is being transported in a direction opposite to the direction transported at the time of printing.

SUMMARY

A printing apparatus includes a transport roller configured to transport a medium through a transport path, a printing unit configured to perform printing on the medium transported by the transport roller through the transport path, an intermediate roller configured to transport again, to the transport path, the medium transported through an inversion path in a reverse direction to a transport direction of the medium to invert a front surface and a back surface of the medium, the inversion path including a branching point where the inversion path branches from the transport path at an upstream side of the transport roller in the transport direction, the inversion path merging with the transport path again at an upstream side of the branching point in the transport direction, a device disposed in the transport path and between the transport roller and the intermediate roller, a first driving device configured to drive the transport roller, and a second driving device configured to drive the intermediate roller, in which the intermediate roller includes an electromagnetic clutch mechanism.

Provided is a method of controlling a printing apparatus including a transport roller configured to transport a medium through a transport path, a printing unit configured to perform printing on the medium transported by the transport roller, an intermediate roller configured to transport again, to the transport path, the medium transported through an inversion path in a reverse direction to a transport direction of the medium to invert a front surface and a back surface of the medium, the inversion path including a branching point where the inversion path branches from the transport path at an upstream side of the transport roller in the transport direction, the inversion path merging with the transport path again at an upstream side of the branching point in the transport direction, an imaging device disposed in the transport path and between the transport roller and the intermediate roller, a first driving device configured to drive the transport roller, a second driving device configured to drive the intermediate roller, and an electromagnetic clutch mechanism provided at the intermediate roller, the method including causing the transport roller and the intermediate roller to both rotate in a forward direction to transport the medium in the transport direction when printing to the medium is performed by the printing unit, causing the transport roller to rotate in a reverse direction that is a direction opposite to the forward direction and causing the intermediate roller to rotate in the forward direction at a time of inverting the front surface and the back surface of the medium on which printing is performed by the printing unit, and causing the intermediate roller to rotate in the reverse direction to transport the medium in the reverse direction at a time of capturing, by the imaging device, an image in which printing is performed on the medium by the printing unit.

Provided is a method of controlling a printing apparatus including a transport roller configured to transport a medium through a transport path, a printing unit configured to perform printing on the medium transported by the transport roller, an intermediate roller configured to transport again, to the transport path, the medium transported through an inversion path in a reverse direction to a transport direction of the medium to invert a front surface and a back surface of the medium, the inversion path including a branching point where the inversion path branches from the transport path at an upstream side of the transport roller in the transport direction, the inversion path merging with the transport path again at an upstream side of the branching point in the transport direction, a processing device disposed in the transport path and between the transport roller and the intermediate roller, a first driving device configured to drive the transport roller, a second driving device configured to drive the intermediate roller, and an electromagnetic clutch mechanism provided at the intermediate roller, the method including causing the transport roller and the intermediate roller to both rotate in a forward direction to transport the medium in the transport direction when printing to the medium is performed by the printing unit, causing the transport roller to rotate in a reverse direction that is a direction opposite to the forward direction and causing the intermediate roller to rotate in the forward direction to control the first driving device and the second driving device at a time of inverting the front surface and the back surface of the medium on which printing is performed by the printing unit, and causing the intermediate roller to rotate in the reverse direction to transport the medium in the reverse direction at a time of performing processing to the medium by the processing device.

DESCRIPTION OF EXEMPLARY EMBODIMENTS

1. First Embodiment

Figure 1:
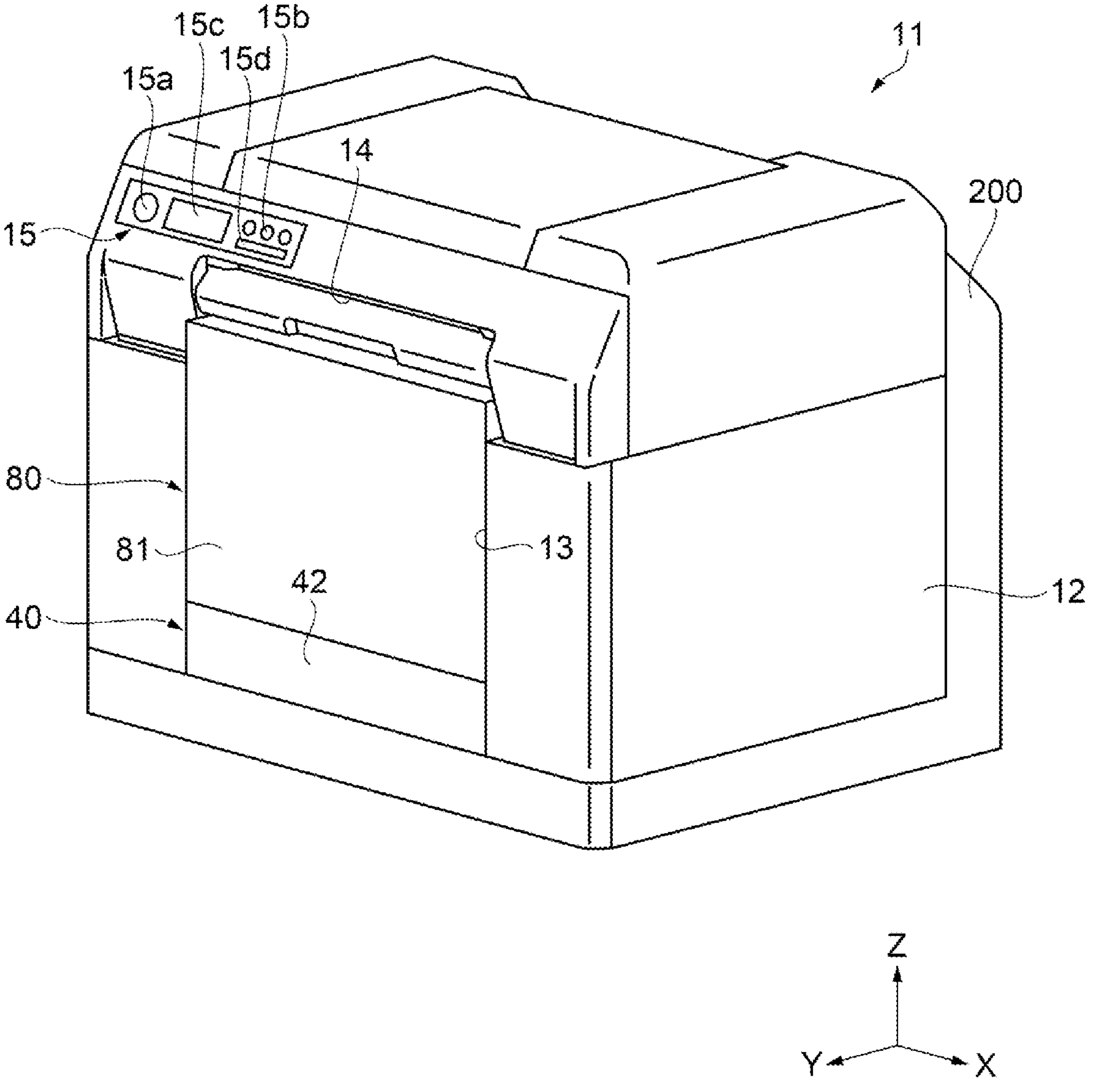
FIG. 1 is a perspective view illustrating a configuration of an external appearance of a printing apparatus according to a first embodiment.

First, a configuration of a printing apparatus 11 will be described. The printing apparatus 11 according to the present embodiment is an ink jet-type device configured to eject ink serving as a liquid onto a medium M to perform printing. The medium M (M1) is, for example, long roll paper R repeatedly wound in a roll form or a cut-sheet-paper type sheet or the like.

In the drawings referred to below, the printing apparatus 11 is in a state of being mounted at a horizontal surface. Directions along the horizontal surface are set such that the front-rear direction of the printing apparatus 11 is a direction along the Y-axis, and the left-right direction (or the width direction) is a direction along the X-axis. In addition, the vertical direction (up-down direction) relative to the horizontal direction is set as a direction along the Z-axis direction. Furthermore, the +Y direction is a frontward direction, the −Y direction is a rearward direction, the +X direction is a rightward direction, the −X direction is a leftward direction, the +Z direction is an upward direction, and the −Z direction is a downward direction.

Figure 2:
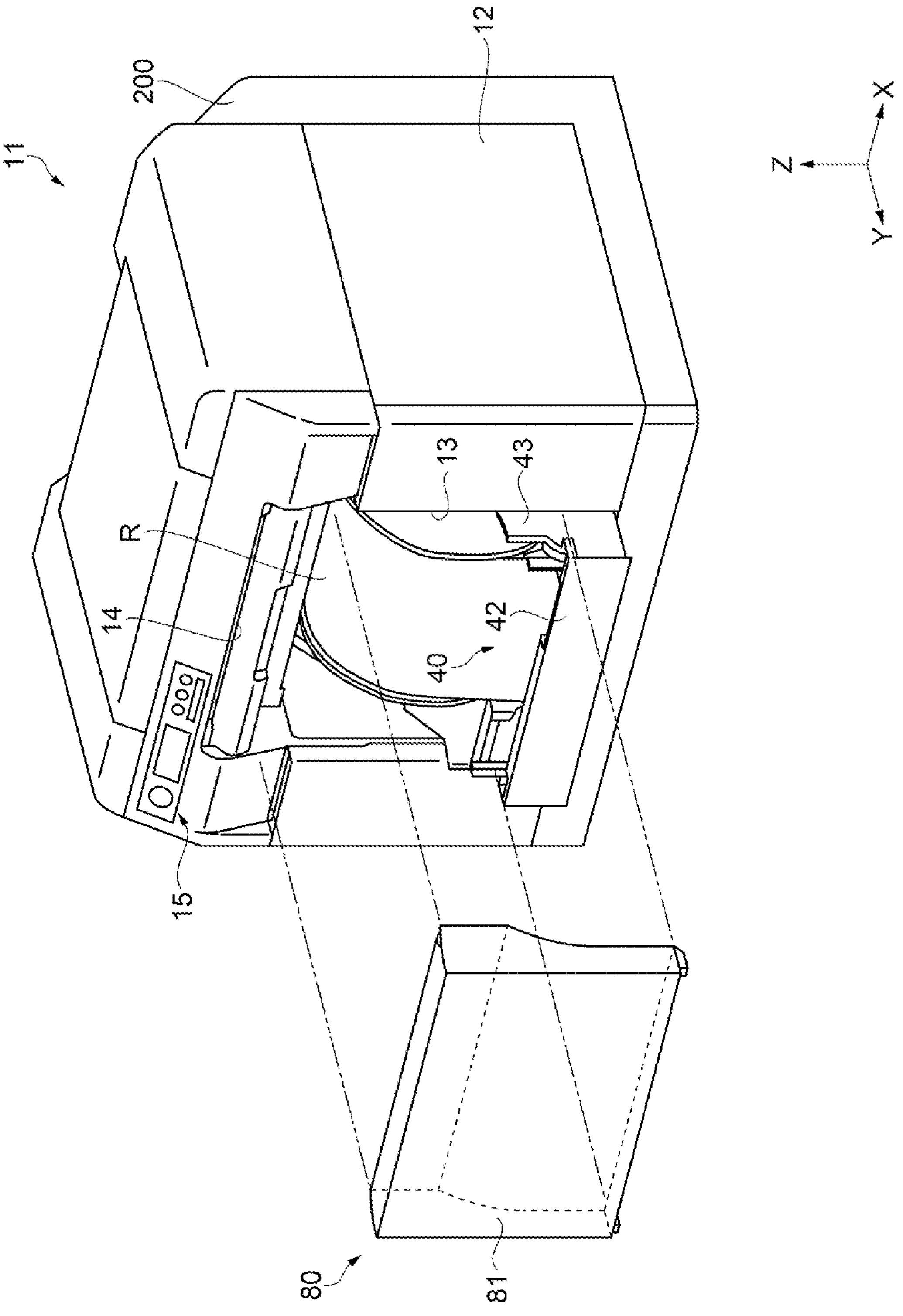
FIG. 2 is a perspective view illustrating a configuration of an external appearance of the printing apparatus according to the first embodiment.
Figure 3:
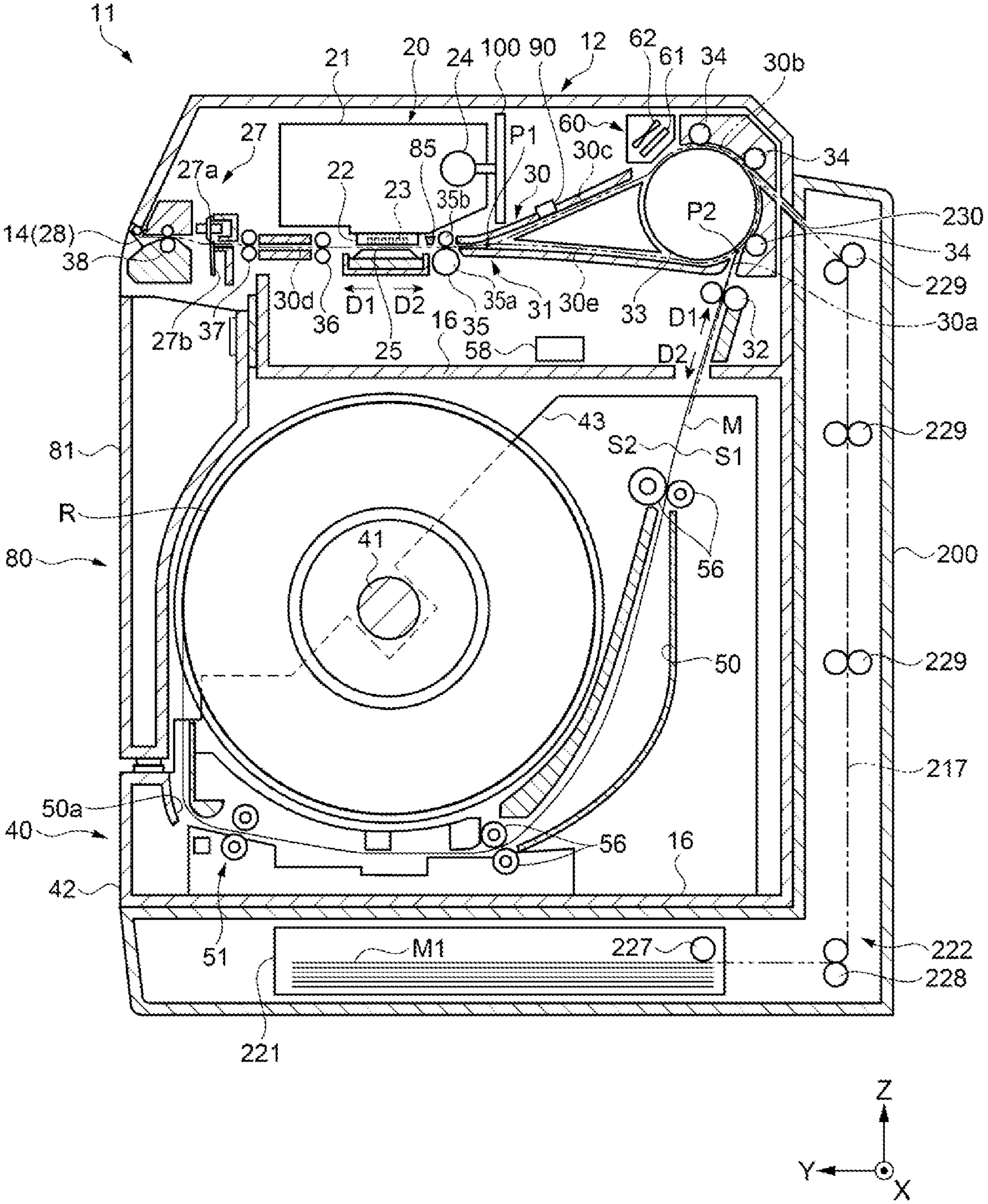
FIG. 3 is a schematic view illustrating a configuration of the inside of the printing apparatus according to the first embodiment.

As illustrated in FIGS. 1, 2, and 3, the printing apparatus 11 includes a housing 12 having a cuboid shape, and a main body frame 16 configured to support each component of the printing apparatus 11. The housing 12 includes an opening portion 13 configured to open at the front face. In addition, the housing 12 includes a discharging unit 28 provided with a discharge port 14 where the cut medium M on which printing has been performed is discharged.

The printing apparatus 11 includes a storage unit 40 configured to store the roll paper R and deliver the stored roll paper R. The storage unit 40 is disposed so as to be able to be pulled out in the forward direction from the housing 12 through the opening portion 13. When the storage unit 40 is stored in the housing 12, the storage unit 40 includes a front plate unit 42 that constitutes a portion of an outer packaging of the printing apparatus 11, and a pair of supporting walls 43 configured to support the roll paper R in a freely rotatable manner.

A cutting-dust accommodating unit 80 having a box shape is provided below the discharging unit 28, and is configured to accommodate cutting dust Mj from the medium M occurring as a result of cutting by a cutting unit 27. The cutting-dust accommodating unit 80 is disposed in front of the roll paper R and at the front face of the housing 12 in a detachable manner. The cutting-dust accommodating unit 80 is attached at the housing 12 to close the opening portion 13. The cutting-dust accommodating unit 80 includes an external wall 81 that constitutes a portion of the outer packaging of the printing apparatus 11 when the cutting-dust accommodating unit 80 is attached at the housing 12.

When the cutting-dust accommodating unit 80 is detached from the housing 12, the storage unit 40 is brought into a state of being able to be pulled out from the housing 12. The roll paper R can be replaced in a state in which the storage unit 40 is pulled out from the housing 12.

In addition, an operation unit 15 used to operate the printing apparatus 11 is provided at the front portion of the housing 12. The operation unit 15 is a panel horizontally elongated in a direction along the X-axis, and includes a power supply button 15*a* to be operated when the printing apparatus 11 is turned on or off, an input button 15*b* configured to be able to receive input of various types of operation information, and an operating panel 15*c* configured to display operation states of the printing apparatus 11 and including operation buttons for the printing apparatus 11. The operating panel 15*c* is a touch panel. In addition, there is provided a speaker 15*d* configured to emit sound toward the outside.

As illustrated in FIG. 3, the printing apparatus 11 includes a transport path 30 (illustrated as the long dashed double-short dashed line in the drawing) configured such that the medium M is transported. The printing apparatus 11 includes a transport unit 31 configured to transport the medium M along the transport path 30, a printing unit 20 configured to perform printing on the medium M, and the cutting unit 27 configured to cut the medium M.

The printing unit 20 is configured to perform printing on the medium M that is transported from the storage unit 40. The printing unit 20 includes a head 22 including a nozzle 23 configured to eject ink toward the medium M, and also includes a carriage 21 on which the head 22 is mounted. The carriage 21 is supported by a guide frame 100 extending along the X-axis and a guide shaft 24 attached to the guide frame 100 and extending along the X-axis. The carriage 21 is configured to be able to move along the guide shaft 24 by a driving source such as a motor. That is, the carriage 21 is able to reciprocate in a direction along the X-axis. A support unit 25 configured to support the medium M is provided at a position that is opposed to the head 22.

The head 22 ejects ink while reciprocating in the width direction of the medium M together with the carriage 21, thereby performing printing on the medium M supported by the support unit 25. The present embodiment gives an example in which the printing unit 20 is of a serial head type in which the head 22 reciprocates in the width direction. However, the printing unit may be of a line head type in which the head 22 extends in the width direction and is arrayed in a fixed manner.

The transport path 30 is a space in which the medium M is able to move, and is comprised of a plurality of members. The transport path 30 extends from the storage unit 40 disposed at the most upstream side and configured to deliver the roll paper R to the discharging unit 28 (discharge port 14) disposed at the most downstream side. The printing unit 20, the support unit 25, and the like are disposed on the transport path 30. The cutting unit 27 is disposed downstream of the support unit 25 and upstream of the discharge port 14. In the present embodiment, the cutting unit 27 includes a movable blade 27*a* configured to be able to reciprocate in the width direction (in the left-right direction) and a fixed blade 27*b* that does not move. The movable blade 27*a* is provided above the transport path 30 and the fixed blade 27*b* is provided below the transport path 30. The cutting unit 27 cuts the medium M at a cutting position throughout the width direction. The cutting position is a position of the edge of the fixed blade 27*b*.

In the present embodiment, the transport path 30 includes, from the upstream side in the transport direction of the medium M, a first path 30*a* where the medium M delivered from the roll paper R is transported, a curved path 30*b* where the medium M is transported in a curved manner, a second path 30*c* (corresponding to a transport path) where the medium M is transported toward the head 22 (support unit 25), and a third path 30*d* where the medium M is transported from the downstream of the support unit 25 toward the discharging unit 28.

In addition, the printing apparatus 11 according to the present embodiment includes an inversion path 30*e*. The inversion path 30*e* is a path connecting a branching point P1 where the path branches from the second path 30*c* and a merging point P2 where the path merges with the first path 30*a*. The merging point P2 is disposed upstream of the branching point P1 in the transport direction of the medium M transported through the curved path 30*b*. That is, the inversion path 30*e* merges at the upstream side of the curved path 30*b*. The inversion path 30*e* is a path used to invert the cut-sheet type medium M to perform printing on both sides of the medium M.

The transport unit 31 is configured to transport the medium M along the transport path 30 from the storage unit 40 through the printing unit 20 to the cutting unit 27 and the discharging unit 28. The transport unit 31 includes a supply roller pair 32 provided at the first path 30*a*, an intermediate roller 33 constituting the curved path 30*b*, a driven roller 34 (corresponding to a second driven roller) disposed along an outer peripheral surface of the intermediate roller 33 of the curved path 30*b*, and an upstream-side transport roller pair 35 provided at the second path 30*c*. The upstream-side transport roller pair 35 is configured to include an upstream-side transport driving roller 35*a* (corresponding to a transport roller), and an upstream-side transport driven roller 35*b* (corresponding to a first driven roller) disposed at a position that is opposed to the upstream-side transport driving roller 35*a* and configured to rotate so as to follow the rotation of the upstream-side transport driving roller 35*a*.

The driven roller 34 is disposed at a position that is opposed to the intermediate roller 33 and is configured to rotate so as to follow the rotation of the intermediate roller 33. In the present embodiment, a plurality (three in the present embodiment) of the driven rollers 34 are provided. This configuration enables the medium M to be smoothly transported along the curved path 30*b*.

Note that the branching point P1 is disposed upstream of the upstream-side transport roller pair 35.

At the third path 30*d*, the transport unit 31 further includes a downstream-side first transport roller pair 36, a downstream-side second transport roller pair 37, and a downstream-side third transport roller pair 38. The downstream-side second transport roller pair 37 is disposed upstream of the cutting unit 27. The downstream-side third transport roller pair 38 is disposed downstream of the cutting unit 27.

Here, the configuration of the storage unit 40 will be described.

The storage unit 40 is configured such that the roll paper R is rotatably supported through a supporting shaft 41 extending in the width direction of the housing 12. The supporting shaft 41 is configured so as to be able to drive and rotate in the forward and inverted directions. Thus, the roll paper R is driven so as to rotate in the forward and inverted directions through the supporting shaft 41. Furthermore, the storage unit 40 includes a roll-paper transport path 50 used to transport, toward the first path 30*a*, the medium M delivered from the roll paper R.

The roll-paper transport path 50 extends downward from the frontward side of the roll paper R supported through the supporting shaft 41, bends in the rearward, extends below and rearward of the roll paper R, then extends toward the upward direction to a position higher than the roll paper R, and extends to the first path 30*a*.

The roll-paper transport path 50 includes a bending portion 50*a* bending at a substantially right angle and disposed at an upstream end portion of the roll-paper transport path 50, that is, disposed at the roll-paper transport path 50 and at a position in front of and in the obliquely downward direction of the roll paper R. The roll-paper transport path 50 includes a decurling mechanism 51 provided downstream of the bending portion 50*a*. The decurling mechanism 51 is used to perform decurling to correct the curling shape of the medium M delivered from the roll paper R.

The roll-paper transport path 50 includes a roll-paper transporting roller pair 56 disposed downstream of the decurling mechanism 51 at an appropriate interval. The roll-paper transporting roller pair 56 is configured to apply transport force to the roll paper R. As the roll-paper transporting roller pair 56 is driven and rotates, the medium M is delivered from the roll paper R and is transported to the first path 30*a*.

The roll-paper transporting roller pair 56, the supply roller pair 32, the intermediate roller 33, the driven roller 34, the upstream-side transport roller pair 35, the downstream-side first transport roller pair 36, the downstream-side second transport roller pair 37, and the downstream-side third transport roller pair 38 rotate in a state in which they sandwich the medium M, thereby transporting the medium M.

As the individual rollers of the transport unit 31 are driven in the forward direction, the medium M is transported from the upstream to the downstream, whereas, as these rollers are driven reversely, the medium M is transported from the downstream to the upstream. In the present embodiment, the direction directed toward the downstream along the transport path 30 is referred to as a downstream direction D1 (corresponding to a transport direction), and the direction opposite to the downstream direction D1 is referred to as an upstream direction D2.

The printing apparatus 11 includes a heating unit 60 configured to heat the transported medium M. The heating unit 60 is disposed so as to be opposed to the intermediate roller 33 disposed at the curved path 30*b*, and is disposed immediately downstream of the driven roller 34 at the most downstream side of the three driven rollers 34. The heating unit 60 is configured to correct the curling of the medium M. In the present embodiment, the heating unit 60 includes a heater 61 configured to generate heat, and a fan 62 configured to blow the heat generated by the heater 61 against the medium M.

A detection unit 85 is provided upstream of the head 22. The detection unit 85 is able to detect the leading end of the transported medium M. In the present embodiment, the detection unit 85 is disposed between the upstream-side transport roller pair 35 and the head 22 above the transport path 30.

The detection unit 85 is, for example, an optical sensor, and includes a light emitting unit configured to be able to emit light and a light-receiving unit configured to be able to receive light. The light emitting unit emits light toward the downward direction of the optical sensor, and the light-receiving unit receives the light reflected on the medium M. The light emitting unit is comprised of a light emitting diode (LED) or a laser emitting element or the like. In addition, the light-receiving unit is configured by a phototransistor, a photo IC, and the like. The light-receiving unit acquires the amount of received light as a voltage value. Furthermore, a threshold value for determining the presence or absence of the medium M is set for the amount of received light (voltage value), and the presence or absence of the medium M is determined by using this threshold value as a reference. This enables detection of the leading end of the medium M.

In addition, the printing apparatus 11 includes an imaging device 90 serving as a "device" and disposed at the transport path 30 from the storage unit 40 through the printing unit 20 to the discharging unit 28. In the present embodiment, the imaging device 90 is disposed between the curved path 30*b* and the head 22 of the printing unit 20. More specifically, the imaging device 90 is disposed between the intermediate roller 33 and the upstream-side transport roller pair 35 (upstream-side transport driving roller 35*a*) at the second path 30*c*.

The second path 30*c* is sloped downward from the upper end portion of the curved path 30*b* toward an ejecting surface (end surface of the head 22 in the −Z direction) where ink is ejected from the head 22 of the printing unit 20. In addition, at least a portion of the imaging device 90 is disposed, in the height direction, between the upper end portion of the curved path 30*b* and the ejecting surface of the head 22. In the present embodiment, the imaging device 90 is disposed between the upper end portion of the curved path 30*b* and the ejecting surface of the head 22. That is, the imaging device 90 is disposed at the second path 30*c* between the upstream-side transport driving roller 35*a* and the intermediate roller 33. This makes it possible to suppress the dimension of the printing apparatus 11 in the height direction. In addition, it is possible to reduce the size of the printing apparatus 11.

The imaging device 90 is configured to image the medium M on which printing is performed. For example, the imaging device 90 images a test pattern printed by the printing unit 20. The imaging device 90 is, for example, a contact optical type sensor (contact image sensor, CIS). The imaging device 90 is a line-type sensor, and includes a photosensor, a light source unit, a lens, and the like. The imaging device 90 is able to capture an image of a region of the medium M in the width direction. In addition, the imaging device 90 is disposed so as to be spaced apart from the discharging unit 28 (discharge port 14). This makes it possible to reduce the influence of the external disturbance light and achieve an image-pickup function.

The imaging device 90 captures an image of a test pattern, for example. The test pattern is a pattern obtained by ejecting ink from the nozzle 23 of the printing unit 20 and comprised of a group of a plurality of straight lines corresponding to each nozzle 23. By using the printed test pattern, it is possible to check the state of ejection from the nozzle 23. In the present embodiment, image data on the test pattern is acquired by the imaging device 90, and a control unit 58 determines whether the state of ejection from the nozzle 23 is good or bad, on the basis of the acquired image data. When the control unit 58 determines that the state of ejection from the nozzle 23 is good, a printing process is performed. On the other hand, when it is determined that the state of ejection from the nozzle 23 is not good due to nozzle out (missing dot) or the like, it is possible to perform a maintenance process such as cleaning.

In addition, the printing apparatus 11 according to the present embodiment is configured so as to be able to perform printing on the cut-sheet type medium M1. In addition, it is possible to perform double-sided printing on the cut-sheet type medium M1.

The printing apparatus 11 is configured to set an accommodation transport body 200 configured to be able to transport the medium M1. The accommodation transport body 200 accommodates a cassette 221 configured to accommodate the medium M1 at an external surface of the housing 12.

The accommodation transport body 200 includes a feeding unit 222 configured to transport, toward the curved path 30*b*, the medium M1 accommodated in the cassette 221.

The feeding unit 222 includes: a pick-up roller 227 configured to send the uppermost medium M1 from among media M1 accommodated in the cassette 221 in a stacked state; a separation roller pair 228 configured to separate, one by one, the medium M1 sent by the pick-up roller 227; and a transport roller pair 229 configured to transport the medium M1 toward the curved path 30*b* along a single-sheet transport path 217.

A communicating path 230 that communicates with the curved path 30*b* is provided at a downstream end of the single-sheet transport path 217. The medium M1 transported from the cassette 221 is transported along the single-sheet transport path 217, and through the communicating path 230, merges with the curved path 30*b*. The medium M1 merging with the curved path 30*b* is transported by the transport unit 31 to the printing unit 20 side.

In addition, it is possible to transport, in the upstream direction D2, the medium M1 on which printing is performed by the printing unit 20, invert the front and back of the medium M1 through the inversion path 30*e*, transport the medium M1 in the downstream direction D1, perform transporting to the printing unit 20, and perform printing on the reverse side. With this configuration, it is possible to perform double-sided printing.

Note that the imaging device 90 is configured to be able to read an image formed on the medium M or the medium M1 while transporting the medium M or the medium M1 in the upstream direction D2. For example, when the medium M1 is a post card, it is possible to read information such as an address or recipient name or a frame for a zip code printed on the post card. This makes it possible to detect the front and back surfaces of the medium M1 or detect the orientation or the like of the medium M1.

Next, the configuration of control of the printing apparatus 11 will be described.

Figure 4:
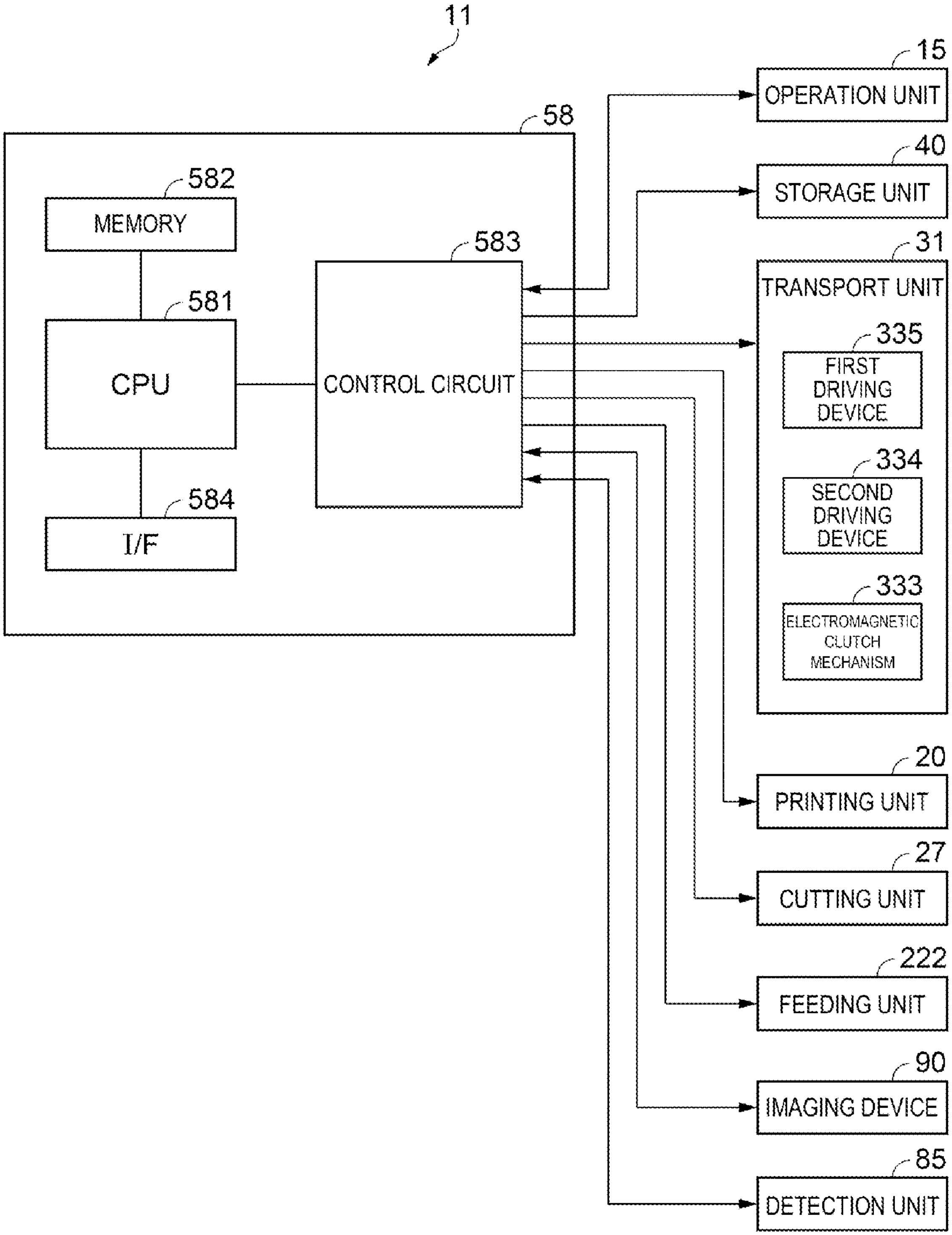
FIG. 4 is a block diagram illustrating a control configuration of the printing apparatus according to the first embodiment.

As illustrated in FIG. 4, the printing apparatus 11 includes the control unit 58 configured to control various types of operations performed in the printing apparatus 11. The control unit 58 includes a CPU 581, a memory 582, a control circuit 583, and an interface (I/F) 584. The CPU 581 is an arithmetic processing device. The memory 582 is a storage device that secures a region for storing programs of the CPU 581, a working region, and the like, and includes a storage element such as a RAM or EEPROM. As print data is acquired through the I/F 584 from the outside such as an information processing terminal, the CPU 581 operates on the basis of a program to control each driving unit or the like through the control circuit 583.

Note that the supply roller pair 32, the intermediate roller 33, the upstream-side transport roller pair 35, the downstream-side first transport roller pair 36, the downstream-side second transport roller pair 37, the downstream-side third transport roller pair 38, the roll-paper transporting roller pair 56, and the transport roller pair 229, each of which constitutes the transport unit 31, are configured such that driving thereof can be controlled.

Here, the printing apparatus 11 according to the present embodiment includes a first driving device 335 configured to drive the upstream-side transport driving roller 35*a*, and a second driving device 334 configured to drive the intermediate roller 33. The first driving device 335 and the second driving device 334 are, for example, motors.

In addition, the intermediate roller 33 includes an electromagnetic clutch mechanism 333. Specifically, configuration is made such that a driving force from the second driving device 334 can be transmitted through the electromagnetic clutch mechanism 333. A coil is disposed within the electromagnetic clutch mechanism 333. For example, by using electromagnetic force occurring as a result of energizing this coil, power from the second driving device 334 is caused to be transmitted to the intermediate roller 33, which makes it possible to cause the intermediate roller 33 to rotate. On the other hand, when energizing the coil is stopped, the electromagnetic force does not occur. Thus, the driving force from the second driving device 334 to the intermediate roller 33 is disconnected. This results in a state in which the intermediate roller 33 does not rotate, and is freely rotatable together with the driven roller 34.

Note that the first driving device 335 may include an electromagnetic clutch mechanism similar to that described above, as necessary.

Next, a method of controlling the printing apparatus 11 will be described.

First, description will be made of a method of controlling printing performed on a first surface S1 (front surface) of the medium M. In particular, description will be made of controlling in terms of a relationship between the upstream-side transport driving roller 35*a* and the intermediate roller 33. Note that the first surface S1 of the medium M is a surface disposed at the outer side in a state in which the medium is repeatedly wound in a roll form. On the other hand, a second surface S2 (back surface) of the medium M is a surface disposed at the inner side in a state in which the medium is repeatedly wound in a roll form.

Figure 5A:
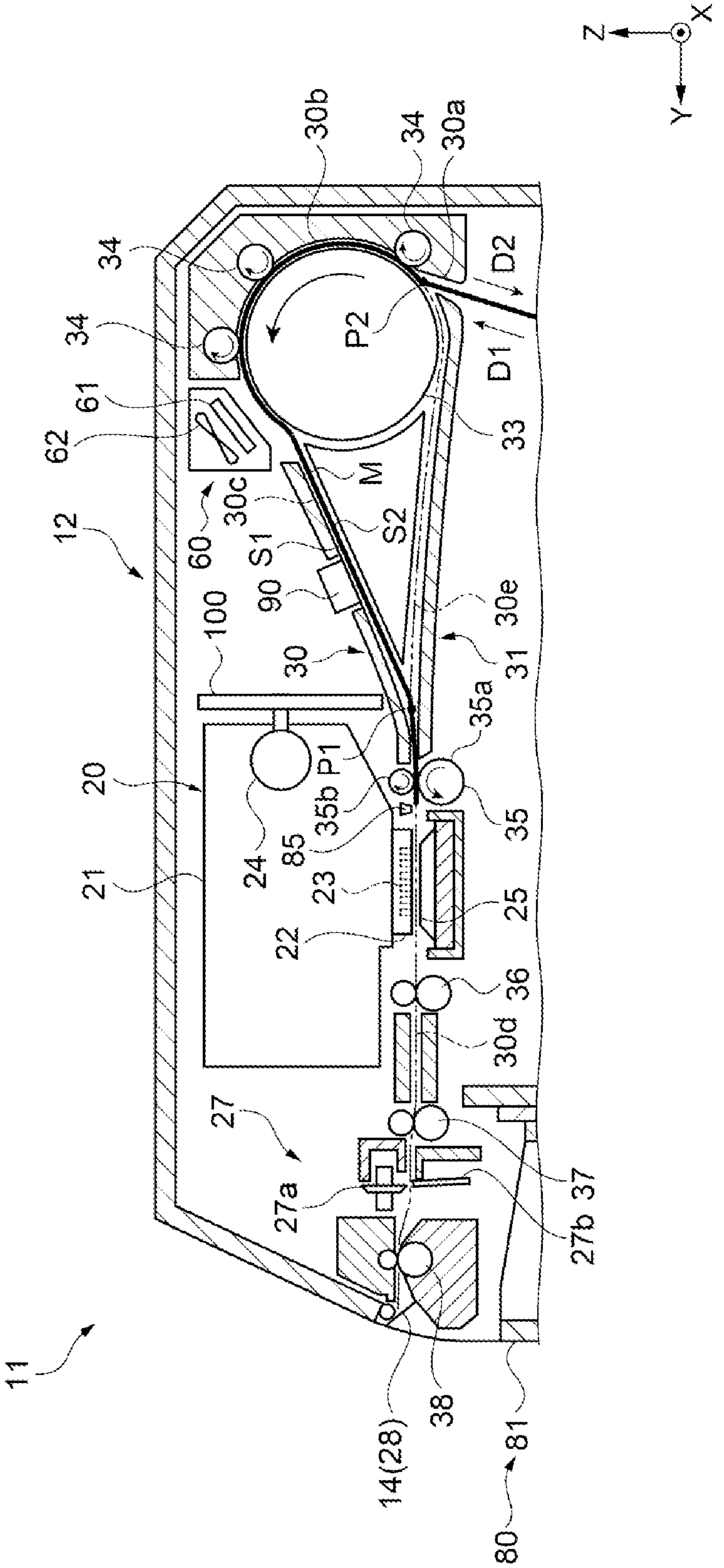
FIG. 5A is a schematic view illustrating a method of controlling a printing apparatus according to the first embodiment.

First, as illustrated in FIG. 5A, the transport unit 31 or the like is caused to drive in the forward direction to cause the medium M to be transported in the downstream direction D1 of the transport path 30.

More specifically, the control unit 58 controls driving of the first driving device 335 and the second driving device 334 until the leading end of the medium M is nipped by the upstream-side transport roller pair 35. With this configuration, the upstream-side transport driving roller 35*a* and the intermediate roller 33 rotate in the forward direction, and the medium M is transported in the downstream direction D1 in a state of being nipped. The medium M passes through the first path 30*a*, the curved path 30*b*, and the second path 30*c* and is transported to the upstream-side transport roller pair 35.

Figure 5B:
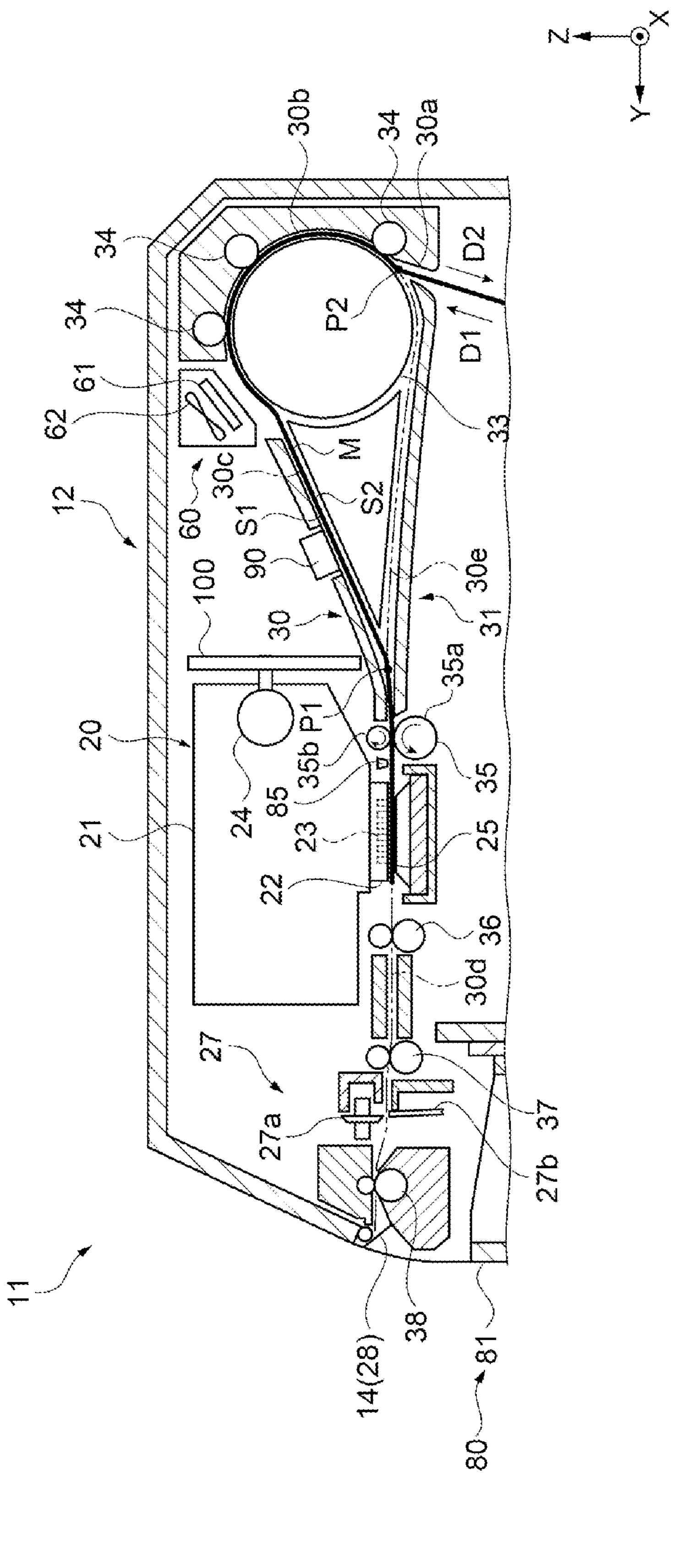
FIG. 5B is a schematic view illustrating the method of controlling the printing apparatus according to the first embodiment.

Next, when the medium M is nipped by the upstream-side transport roller pair 35 and is also nipped by the intermediate roller 33 and the driven roller 34 as illustrated in FIG. 5B, the control unit 58 controls the electromagnetic clutch mechanism 333 so as to cut the transmission of the driving force by the second driving device 334 to the intermediate roller 33.

Specifically, when the upstream-side transport roller pair 35 nips the leading end of the medium M, the control unit 58 stops energizing the coil of the electromagnetic clutch mechanism 333. With this configuration, the driving force from the second driving device 334 to the intermediate roller 33 is cut, and driving and rotating the intermediate roller 33 is stopped to bring the intermediate roller 33 together with the driven roller 34 into a freely rotatable state.

In addition, the medium M is transported in the downstream direction D1 in a state in which the transporting force for the medium M with the intermediate roller 33 and the driven roller 34 is lost and the upstream-side transport roller pair 35 nips the medium M. That is, at the time of printing, the medium M is transported using the upstream-side transport roller pair 35 alone. With this configuration, during printing, a difference in transport velocity of the medium M occurring due to the upstream-side transport roller pair 35 and the intermediate roller 33 together with the driven roller 34 does not occur, which makes it possible to accurately transport the medium M. Note that detection sensors (not illustrated) configured to detect the presence or absence of the medium M are disposed at a plurality of portions of the transport path 30. The detection sensors always output the detected information about the presence or absence of the medium M to the control unit 58. Thus, at a detection position of the detection sensor, the control unit 58 is able to obtain information in which the leading end of the medium M passes through. This makes it possible to detect whether or not the medium M is nipped at the upstream-side transport roller pair 35.

Then, the printing unit 20 is driven to cause a test pattern to be printed on the medium M.

Figure 5C:
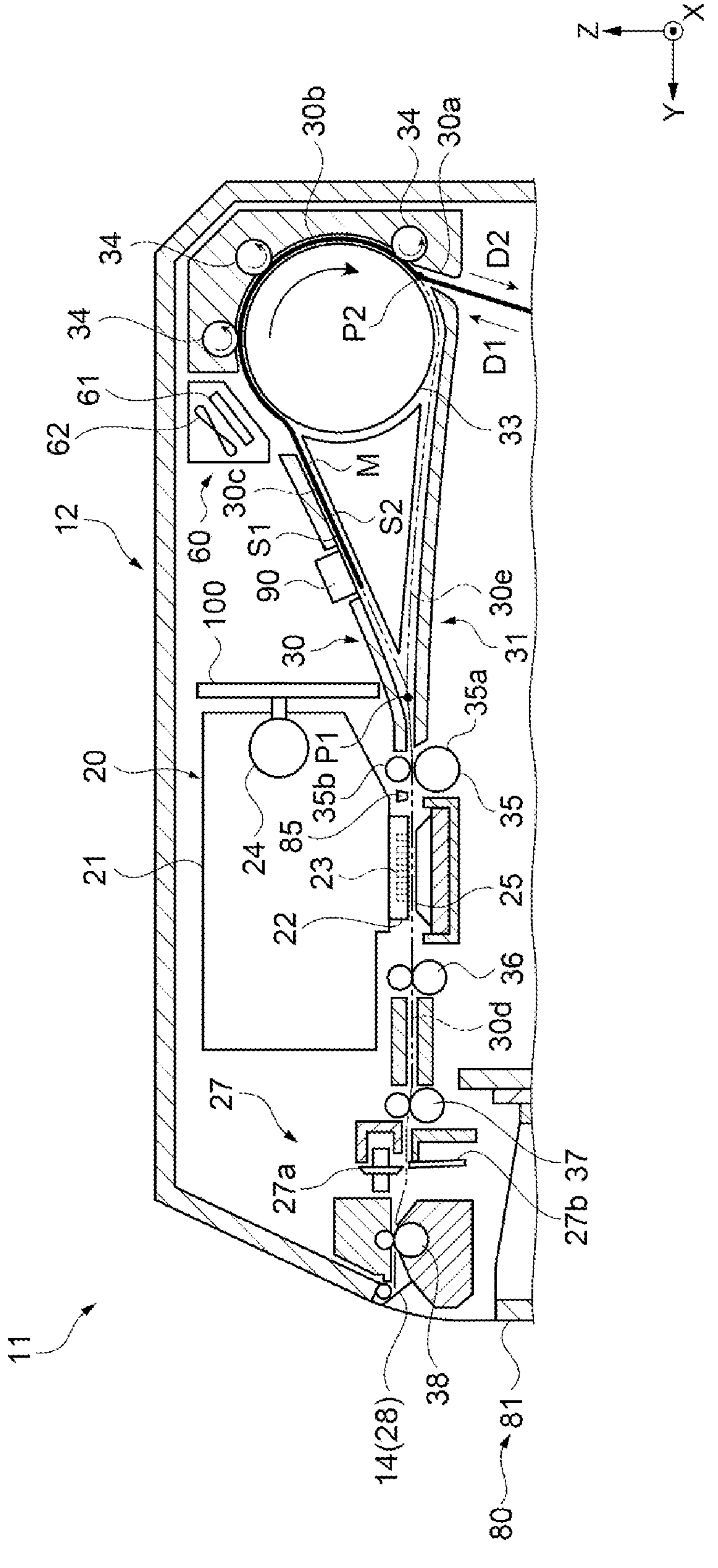
FIG. 5C is a schematic view illustrating the method of controlling the printing apparatus according to the first embodiment.

Next, as illustrated in FIG. 5C, the control unit 58 causes the medium M to be transported in the upstream direction D2 of the transport path 30 to a position where a portion of the medium M on which the test pattern is printed is opposed to the imaging device 90. Then, the imaging device 90 is driven to image the test pattern of the medium M transported in the upstream direction D2.

Specifically, when the imaging device 90 is caused to image a test pattern (image) printed on the medium M by the printing unit 20, the control unit 58 causes the intermediate roller 33 to rotate in the reverse direction. That is, the second driving device 334 is controlled to cause the intermediate roller 33 to rotate in the reverse direction. With this configuration, the medium M is transported in the upstream direction D2. At this time, the control unit 58 stops driving the first driving device 335. That is, when an image of a test pattern or the like printed on the medium M is imaged by the imaging device 90, only the intermediate roller 33 is driven to transport the medium M. With this configuration, when the medium M is transported in the upstream direction D2 at the time of performing imaging by the imaging device 90, a difference in transport velocity of the medium M due to the upstream-side transport roller pair 35 and the intermediate roller 33 together with the driven roller 34 does not occur. This makes it possible to accurately transport the medium M and reliably image the test pattern (image).

Image data on the test pattern imaged by the imaging device 90 is transmitted to the control unit 58. The control unit 58 determines the state of ejection by the printing unit 20 on the basis of the received image data. For example, it is determined whether or not any nozzle out of the head 22 occurs. When it is determined that no nozzle out of the head 22 exists, the printing process continues. On the other hand, when it is determined the nozzle out of the head 22 exists, a maintenance process such as cleaning is performed.

In addition, notification is made of a result of determination on the basis of the result of determination by the control unit 58. Specifically, it may be possible to cause the operating panel 15*c* of the operation unit 15 to display the result of determination, or it may be possible to make notification using sound through the speaker 15*d*. This enables a user to easily know the state of ejection by the printing unit 20.

Figure 5D:
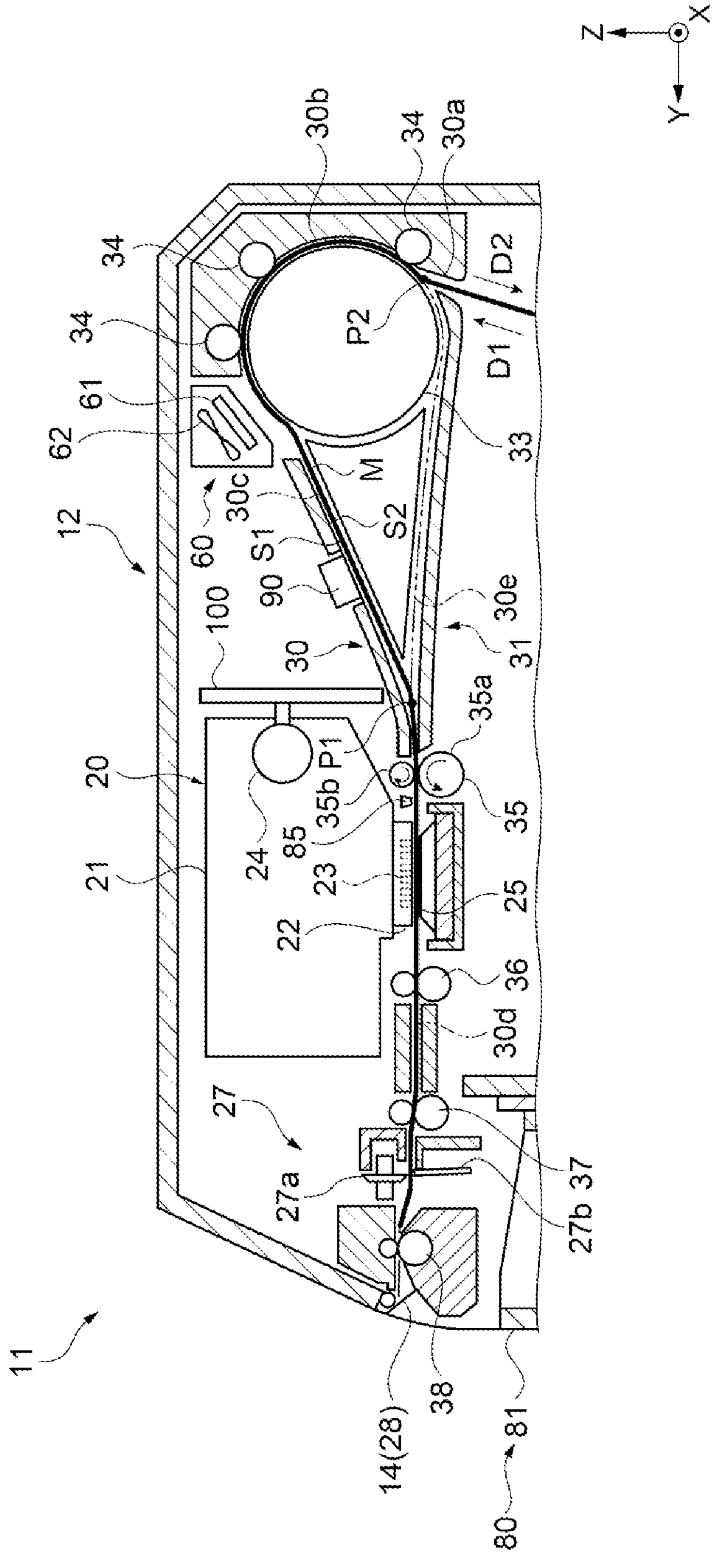
FIG. 5D is a schematic view illustrating the method of controlling the printing apparatus according to the first embodiment.

Next, when it is determined that no nozzle out of the head 22 exists, the control unit 58 causes the medium M to be transported in the downstream direction D1, as illustrated in FIG. 5D.

Specifically, the control unit 58 controls driving of the first driving device 335 and the second driving device 334 until the leading end of the medium M is nipped by the upstream-side transport roller pair 35. With this configuration, the upstream-side transport driving roller 35*a* and the intermediate roller 33 rotate in the forward direction, and the medium M is transported in the downstream direction D1 in a state of being nipped.

Next, when the upstream-side transport roller pair 35 nips the leading end of the medium M, the control unit 58 stops energizing the coil of the electromagnetic clutch mechanism 333. With this configuration, power from the second driving device 334 to the intermediate roller 33 is cut, and driving and rotating the intermediate roller 33 is stopped to bring the intermediate roller 33 together with the driven roller 34 into a freely rotatable state. This causes the medium M to be transported by using the upstream-side transport roller pair 35 alone. Thus, any difference in transport velocity of the medium M due to the upstream-side transport roller pair 35 and the intermediate roller 33 together with the driven roller 34 does not occur, which makes it possible to accurately transport the medium M.

Then, the medium M is transported until a portion of the medium M where a test pattern is printed reaches the downstream side of the cutting unit 27. In addition, the cutting unit 27 is caused to drive to cut the portion of the medium M where the test pattern is printed.

Figure 5E:
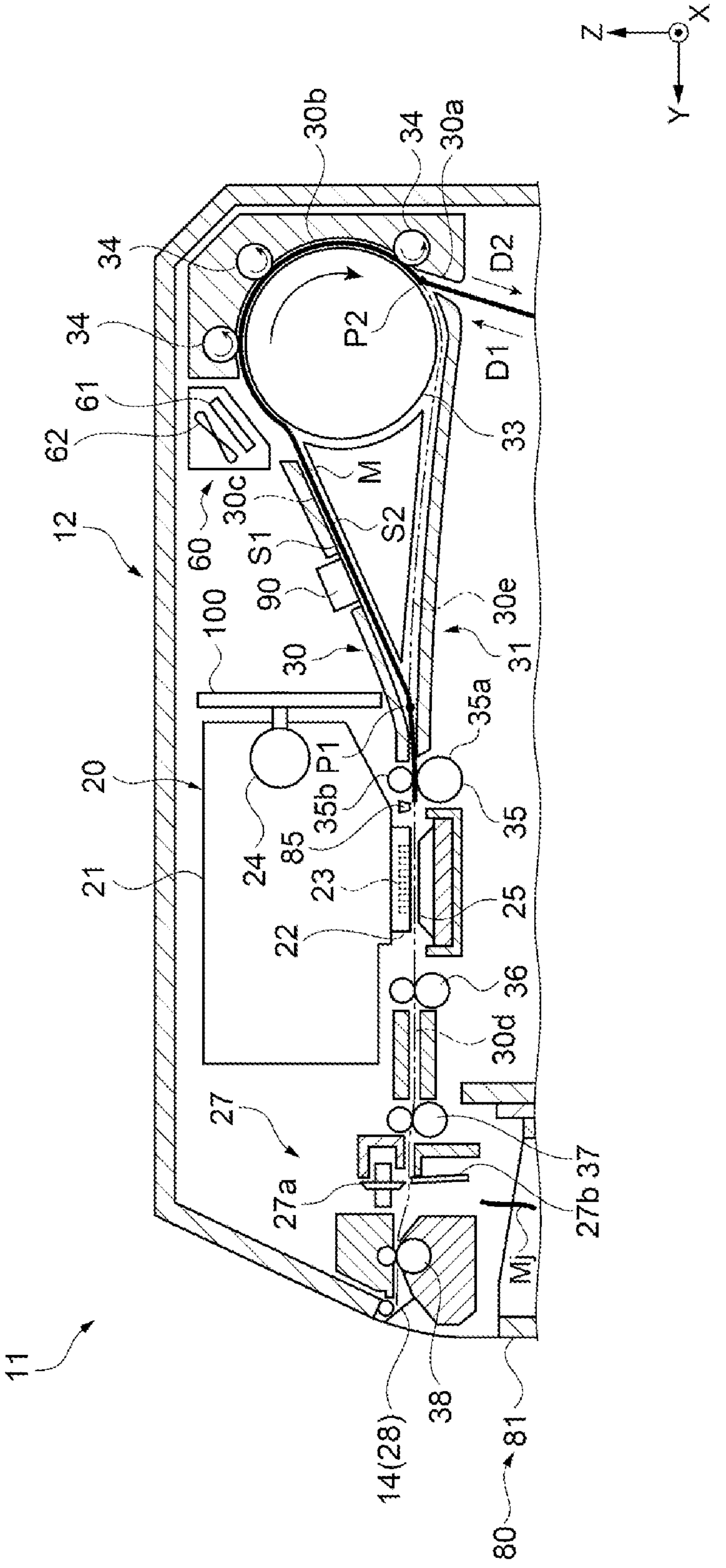
FIG. 5E is a schematic view illustrating the method of controlling the printing apparatus according to the first embodiment.

Next, as illustrated in FIG. 5E, the cutting dust Mj of the medium M that has been cut drops downward, and is accommodated in the cutting-dust accommodating unit 80.

In addition, the control unit 58 causes the medium M to be transported in the upstream direction D2 of the transport path 30 until the leading end of the medium M reaches a position upstream of the head 22.

Specifically, the control unit 58 causes the intermediate roller 33 to rotate in the reverse direction. That is, the control unit 58 controls the second driving device 334 to cause the intermediate roller 33 to rotate in the reverse direction. With this configuration, the medium M is transported in the upstream direction D2. At this time, the control unit 58 stops driving the first driving device 335. That is, when the medium M is caused to be transported in the upstream direction D2, only the intermediate roller 33 is driven to transport the medium M. This prevents occurrence of the difference in transport velocity of the medium M due to the upstream-side transport roller pair 35 and the intermediate roller 33 together with the driven roller 34. This makes it possible to accurately transport the medium M, and cause the leading end of the medium M to be transported to a predetermined position.

In addition, when the leading end of the medium M is detected by the detection unit 85, driving the second driving device 334 is stopped. This allows to stop in a state in which the leading end of the medium M is located upstream of the head 22 and the leading end of the medium M is nipped by the upstream-side transport roller pair 35.

Figure 5F:
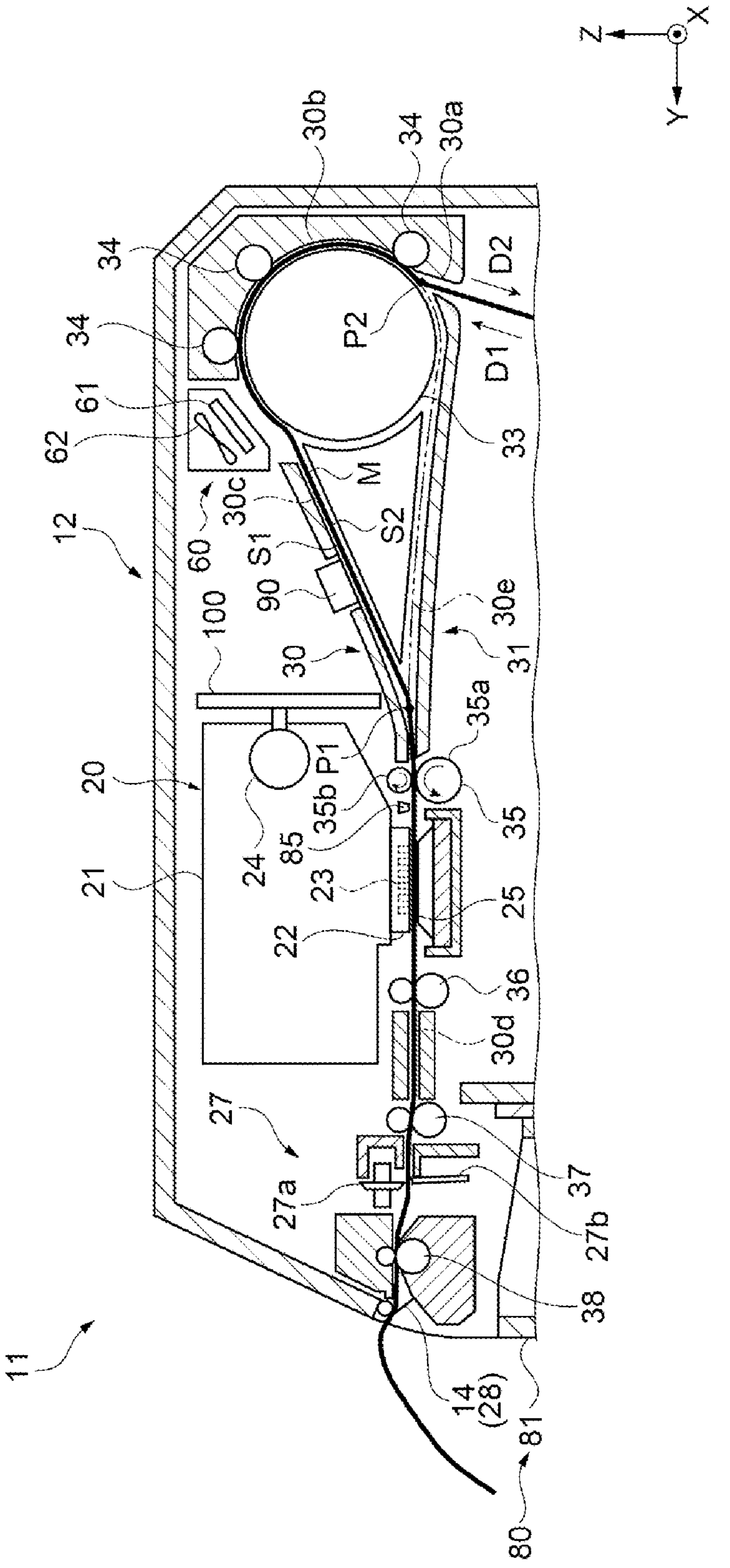
FIG. 5F is a schematic view illustrating the method of controlling the printing apparatus according to the first embodiment.

Next, as illustrated in FIG. 5F, an image is printed on the medium M while the medium M is being transported in the downstream direction D1.

The control unit 58 stops energizing the coil of the electromagnetic clutch mechanism 333. With this configuration, the driving force from the second driving device 334 to the intermediate roller 33 is cut, and driving and rotating the intermediate roller 33 is stopped to bring the intermediate roller 33 together with the driven roller 34 into a freely rotatable state.

Then, the first driving device 335 is caused to drive to transport the medium M in the downstream direction D1. That is, during printing, the medium M is transported using only the upstream-side transport roller pair 35. With this configuration, during printing, a difference in transport velocity of the medium M occurring due to the upstream-side transport roller pair 35 and the intermediate roller 33 together with the driven roller 34 does not occur, which makes it possible to accurately transport the medium M.

Then, the cutting unit 27 is driven at predetermined timing to cause it to cut the medium M. The cut medium M is discharged from the discharge port 14.

Next, description will be made of a controlling method concerning double-sided printing in which the first surface S1 of the medium M on which printing is performed by the printing unit 20 is inverted to perform printing on the second surface S2 of the medium M.

Figure 6A:
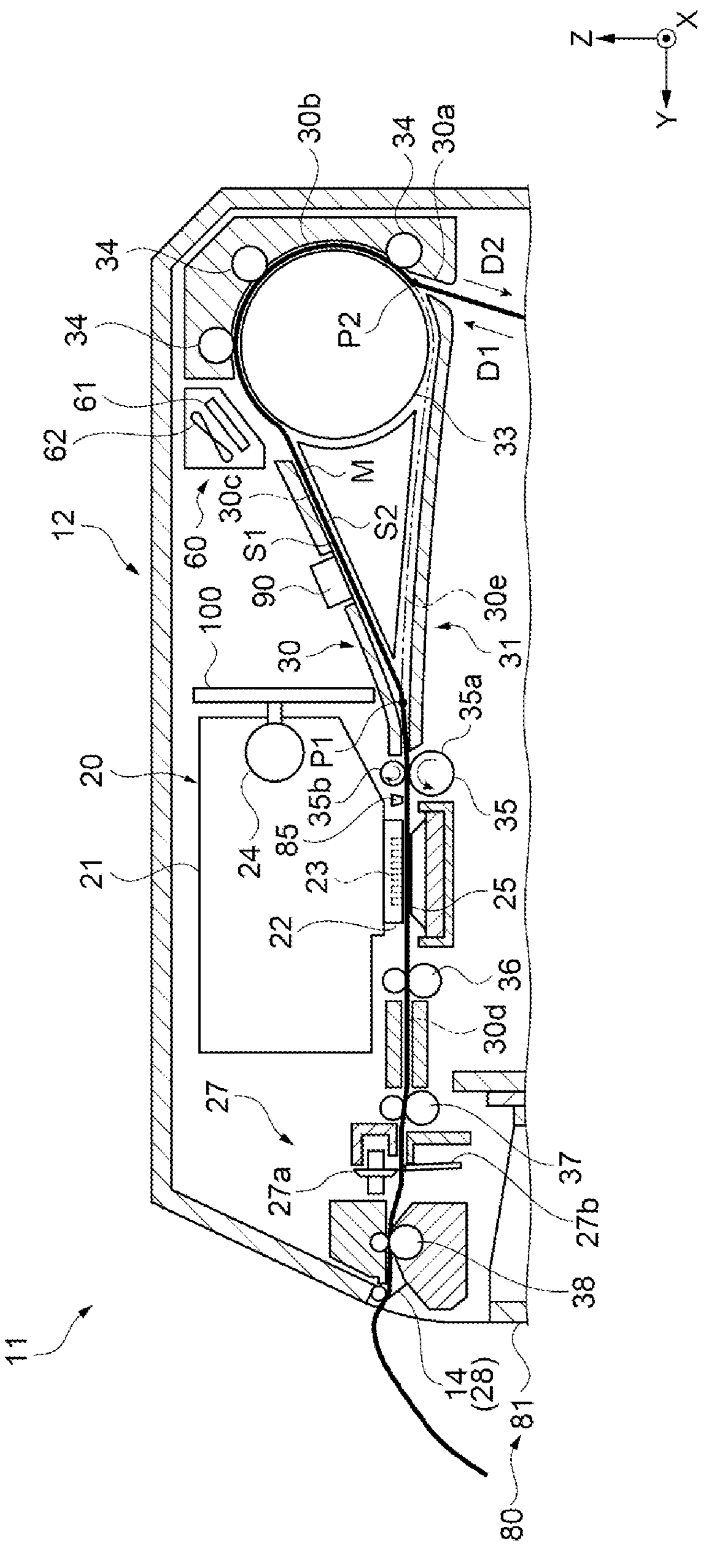
FIG. 6A is a schematic view illustrating another method of controlling the printing apparatus according to the first embodiment.

As illustrated in FIG. 6A, the control unit 58 stops energizing the coil of the electromagnetic clutch mechanism 333, causes the first driving device 335 to drive in a state in which the driving force from the second driving device 334 to the intermediate roller 33 is cut, and causes an image to be printed on the first surface S1 of the medium M while the medium M is being transported in the downstream direction D1 by the upstream-side transport roller pair 35.

Figure 6B:
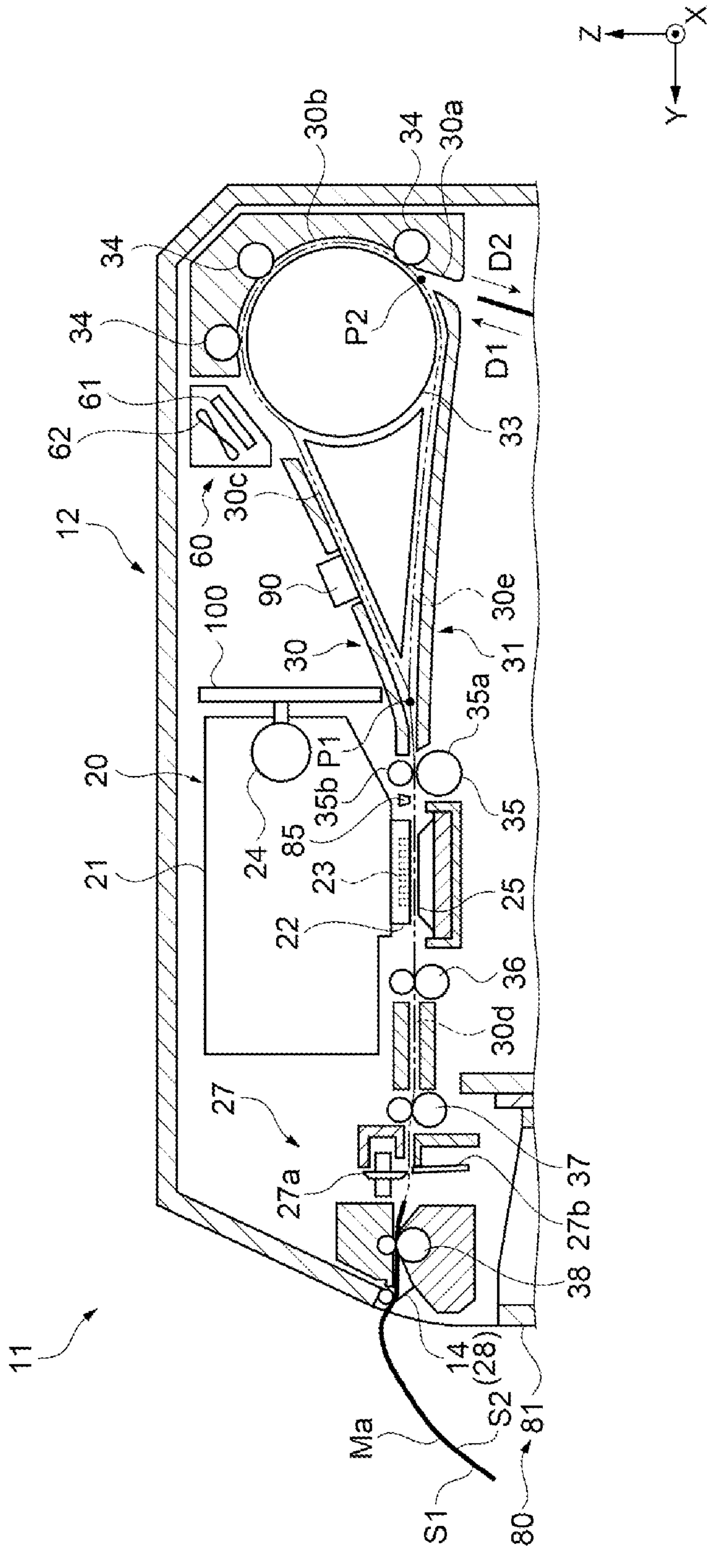
FIG. 6B is a schematic view illustrating another method of controlling the printing apparatus according to the first embodiment.

Next, as illustrated in FIG. 6B, the cutting unit 27 is caused to drive at predetermined timing to cut the medium M. In addition, the control unit 58 stops driving the downstream-side third transport roller pair 38 to cause the medium Ma that has been cut into a cut sheet to be held.

Furthermore, the control unit 58 causes the roll-paper transporting roller pair 56, the supply roller pair 32, the intermediate roller 33, the upstream-side transport roller pair 35, the downstream-side first transport roller pair 36, and the downstream-side second transport roller pair 37 to drive reversely, and causes the medium M to be transported in the upstream direction D2 of the transport path 30 until the leading end of the medium M reaches a position disposed upstream of the merging point P2.

Figure 6C:
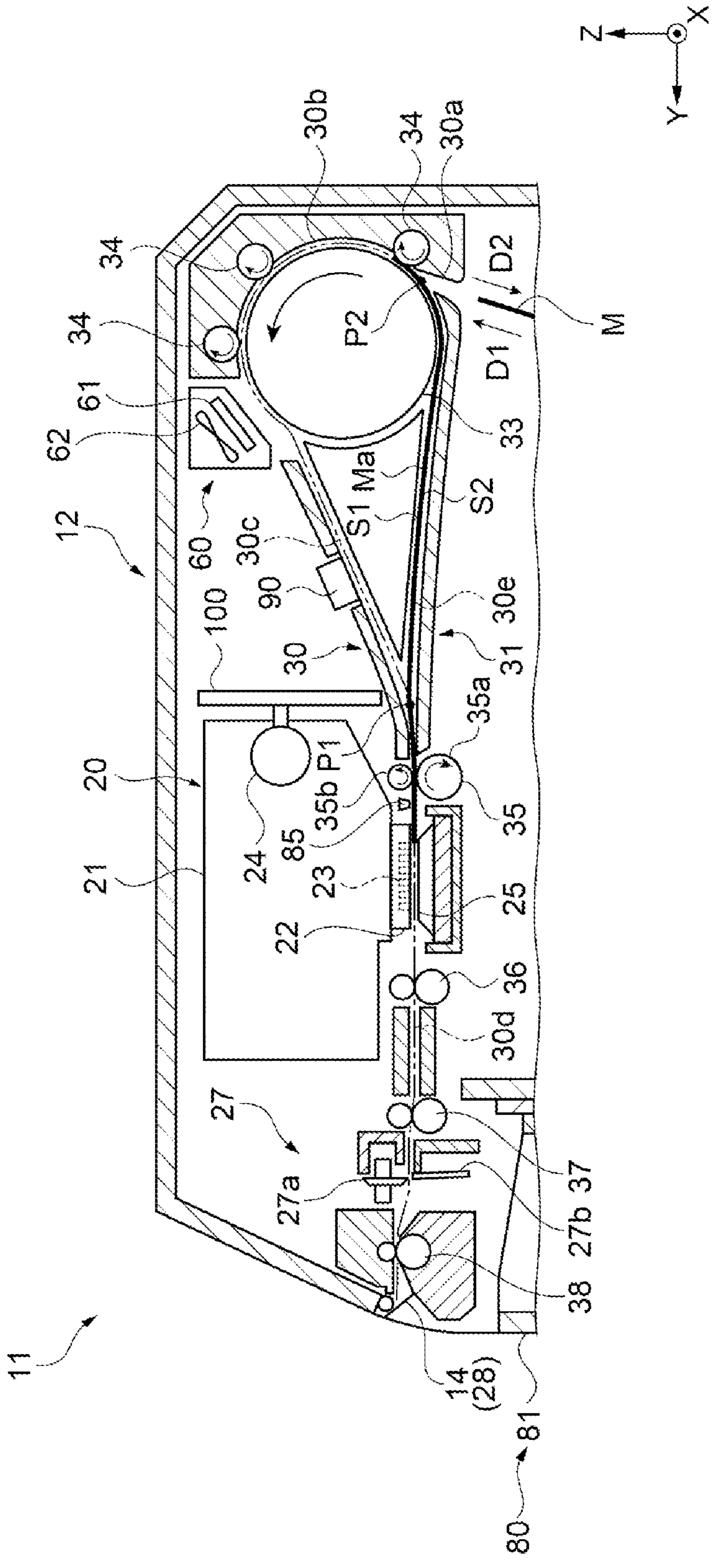
FIG. 6C is a schematic view illustrating another method of controlling the printing apparatus according to the first embodiment.

Next, as illustrated in FIG. 6C, the control unit 58 causes the downstream-side third transport roller pair 38 to reversely drive, and also causes the upstream-side transport roller pair 35, the downstream-side first transport roller pair 36, and the downstream-side second transport roller pair 37 to reversely drive to cause the medium Ma to be transported in the upstream direction D2 of the transport path 30, thereby causing the medium Ma to be pulled into the inversion path 30*e*. On the other hand, the control unit 58 causes the intermediate roller 33 to drive in the forward direction, thereby causing the medium Ma that has been pulled into the inversion path 30*e* to be transported in the downstream direction D1 along the curved path 30*b* and the second path 30*c*. This makes it possible to cause the medium Ma to be inverted, and cause the second surface S2 of the medium Ma to face the head 22.

Figure 6D:
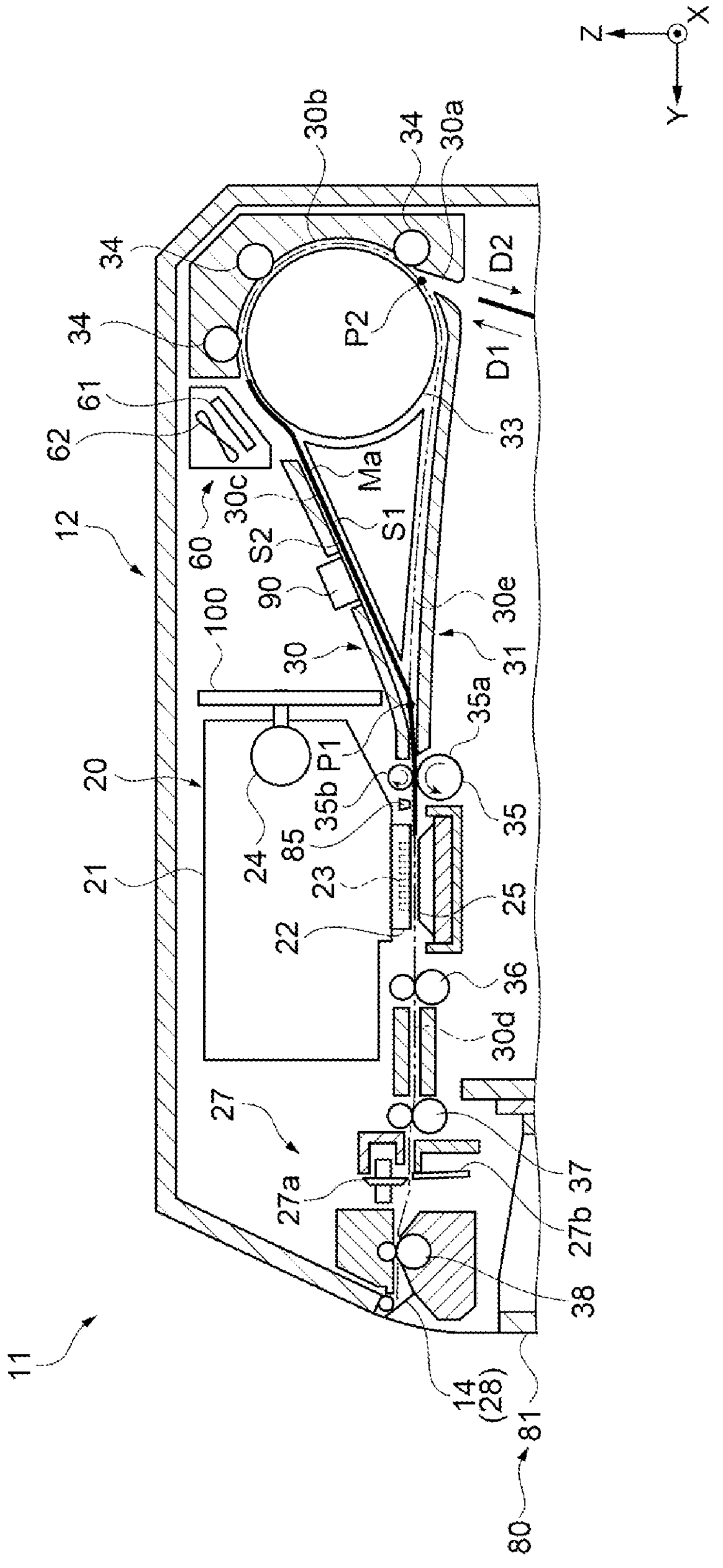
FIG. 6D is a schematic view illustrating another method of controlling the printing apparatus according to the first embodiment.

Next, as illustrated in FIG. 6D, when the upstream-side transport roller pair 35 nips the leading end of the medium Ma, the control unit 58 stops energizing the coil of the electromagnetic clutch mechanism 333. With this configuration, the driving force from the second driving device 334 to the intermediate roller 33 is cut, and driving and rotating the intermediate roller 33 is stopped to bring the intermediate roller 33 together with the driven roller 34 into a freely rotatable state.

In addition, the medium M is transported in the downstream direction D1 in a state in which the transporting force for the medium Ma with the intermediate roller 33 and the driven roller 34 is lost and the upstream-side transport roller pair 35 nips the medium Ma. With this configuration, during printing, a difference in transport velocity of the medium Ma occurring due to the upstream-side transport roller pair 35 and the intermediate roller 33 together with the driven roller 34 does not occur, which makes it possible to smoothly transport the medium Ma and form an image at an accurate position of the medium Ma.

Then, ink is caused to be ejected onto the second surface S2 while the medium Ma is being caused to be transported in the downstream direction D1, to print an image. With this operation, printing is performed on both sides of the first surface S1 and the second surface S2 of the medium Ma.

After this, the medium Ma is caused to be further transported in the downstream direction D1. Then, the medium Ma is discharged from the discharge port 14.

As described above, with the present embodiment, the imaging device 90 is disposed between the upstream-side transport roller pair 35 (upstream-side transport driving roller 35*a*) and the intermediate roller 33 at the transport path 30. This makes it possible to reduce the size of the printing apparatus 11. In addition, with the control of driving the first driving device 335, the second driving device 334, and the electromagnetic clutch mechanism 333, it is possible to improve the transport property of the medium M, Ma in various types of processing modes such as at the time of performing printing on the medium M, Ma, at the time of inverting, at the time of imaging, and the like.

Note that the present embodiment has been described by giving an example in which the roll paper R is used as the medium M. However, in a case of using a cut-sheet type medium M1, it is also possible to perform controlling in a similar manner, and it is possible to obtain a similar effect.

2. Second Embodiment

Next, a second embodiment will be described.

Figure 7:
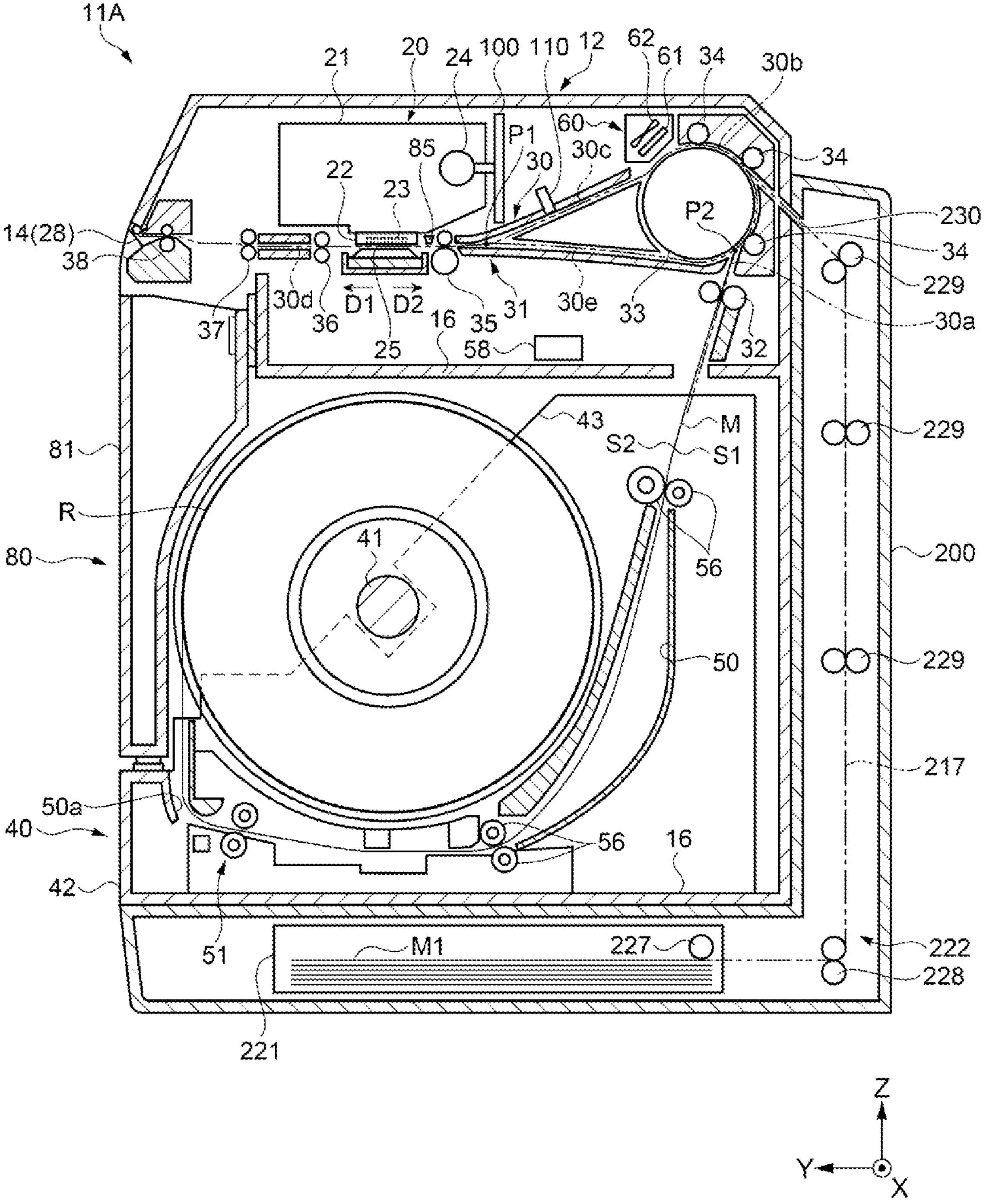
FIG. 7 is a schematic view illustrating a configuration of the inside of a printing apparatus according to a second embodiment.

As illustrated in FIG. 7, a printing apparatus 11A according to the present embodiment includes a processing device serving as a "device" and disposed between the upstream-side transport driving roller 35*a* and the intermediate roller 33 at the second path 30*c*. In the present embodiment, the processing device is a cutter 110. The cutter 110 is used to perform a cutting process in which the medium M is cut. Driving of the cutter 110 is controlled by the control unit 58. Note that the same reference characters are attached to the same configurations as those in the first embodiment, and explanation thereof will not be repeated.

Next, a method of controlling the printing apparatus 11A will be described.

Figure 8A:
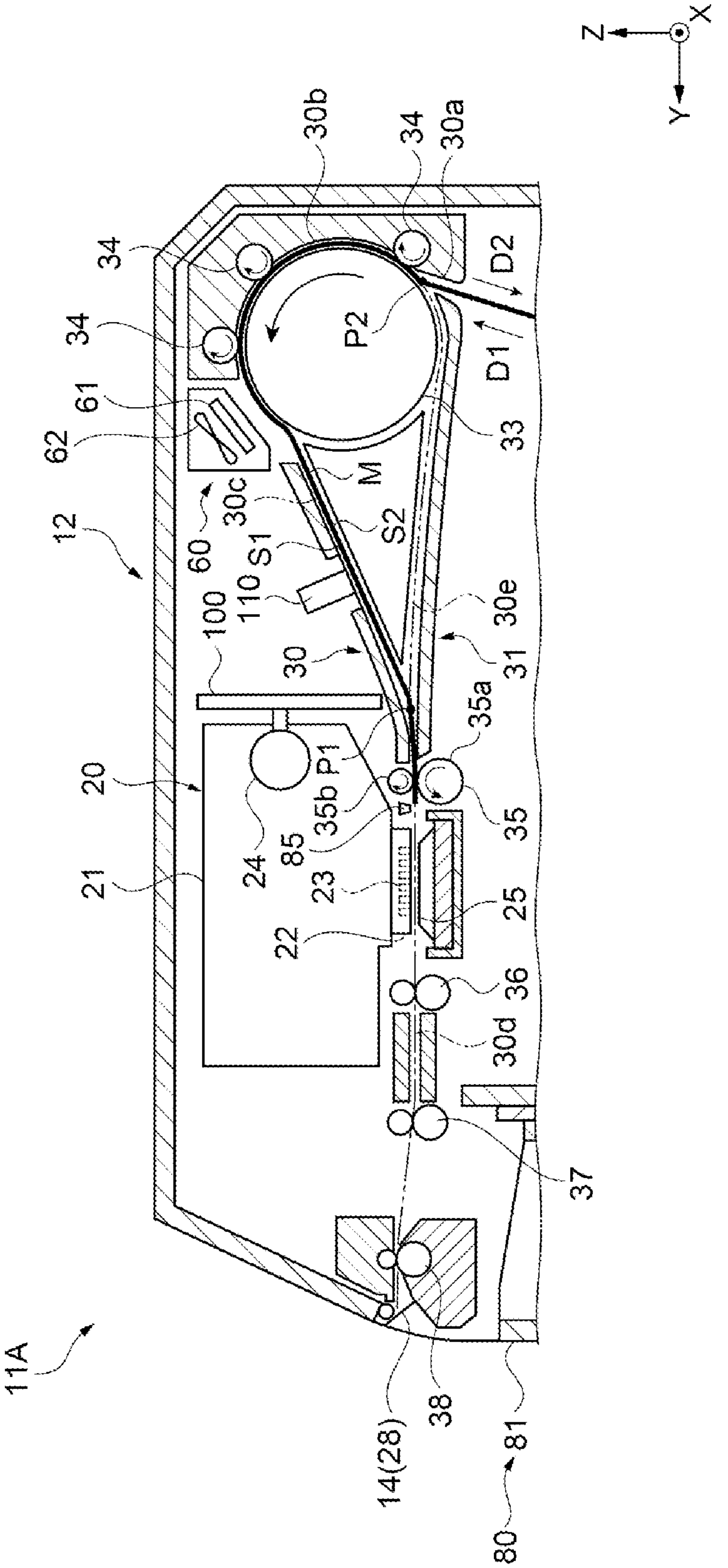
FIG. 8A is a schematic view illustrating a method of controlling the printing apparatus according to the second embodiment.

First, as illustrated in FIG. 8A, the transport unit 31 and the like are caused to drive in the forward direction to cause the medium M to be transported in the downstream direction D1 of the transport path 30.

Specifically, the control unit 58 controls driving of the first driving device 335 and the second driving device 334 until the leading end of the medium M is nipped by the upstream-side transport roller pair 35. With this configuration, the upstream-side transport driving roller 35*a* and the intermediate roller 33 rotate in the forward direction, and the medium M is transported in the downstream direction D1 in a state of being nipped. The medium M passes through the first path 30*a*, the curved path 30*b*, and the second path 30*c*, and is transported to the upstream-side transport roller pair 35.

Figure 8B:
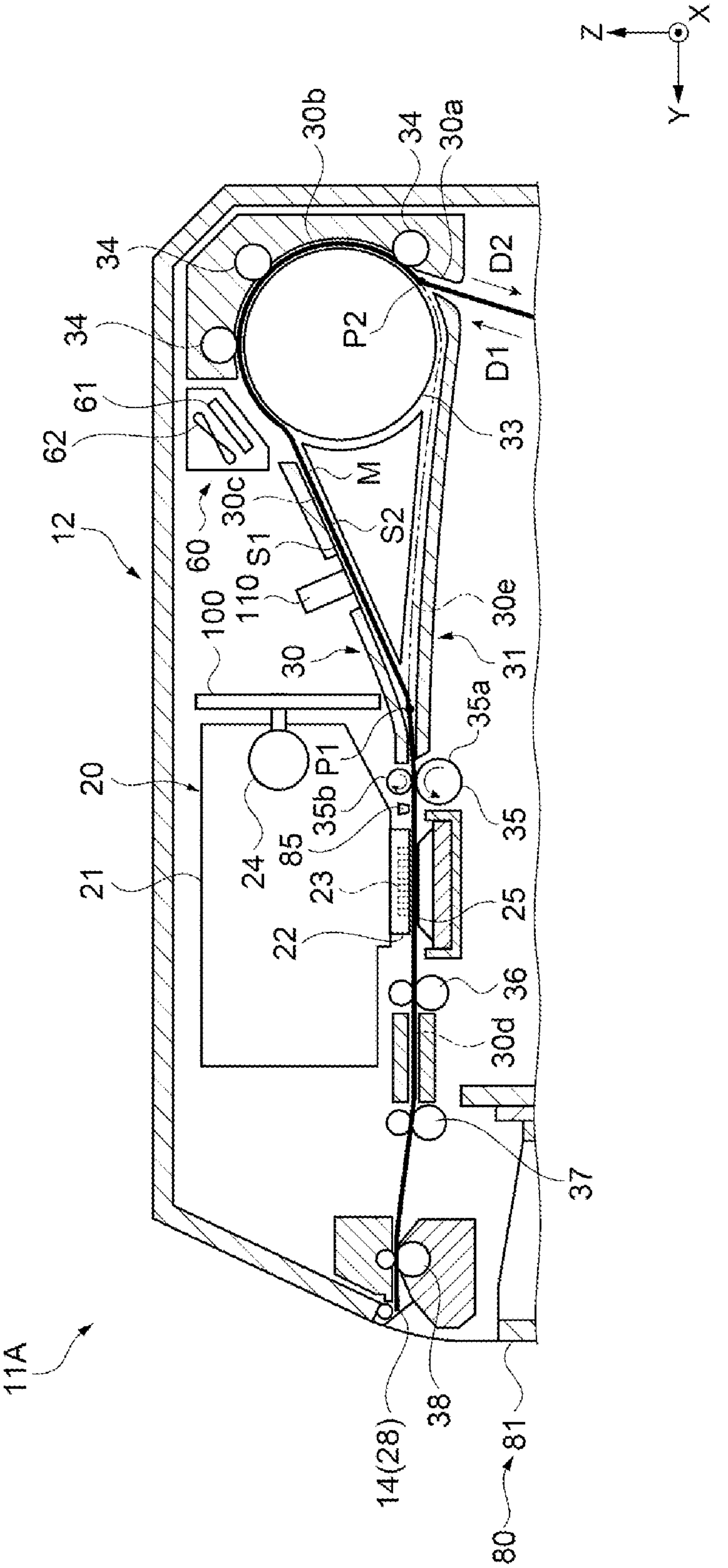
FIG. 8B is a schematic view illustrating a method of controlling the printing apparatus according to the second embodiment.

Next, when the medium M is nipped by the upstream-side transport roller pair 35 and is also nipped by the intermediate roller 33 and the driven roller 34 as illustrated in FIG. 8B, the control unit 58 controls the electromagnetic clutch mechanism 333 so as to cut the transmission of the driving force by the second driving device 334 to the intermediate roller 33.

Specifically, when the upstream-side transport roller pair 35 nips the leading end of the medium M, the control unit 58 stops energizing the coil of the electromagnetic clutch mechanism 333. With this configuration, the driving force from the second driving device 334 to the intermediate roller 33 is cut, and driving and rotating the intermediate roller 33 is stopped to bring the intermediate roller 33 together with the driven roller 34 into a freely rotatable state.

In addition, the medium M is transported in the downstream direction D1 in a state in which the transporting force for the medium M with the intermediate roller 33 and the driven roller 34 is lost and the upstream-side transport roller pair 35 nips the medium M. That is, at the time of printing, the medium M is transported using the upstream-side transport roller pair 35 alone. With this configuration, during printing, a difference in transport velocity of the medium M occurring due to the upstream-side transport roller pair 35 and the intermediate roller 33 together with the driven roller 34 does not occur, which makes it possible to accurately transport the medium M. Next, the printing unit 20 is caused to drive to print an image on the medium M.

Figure 8C:
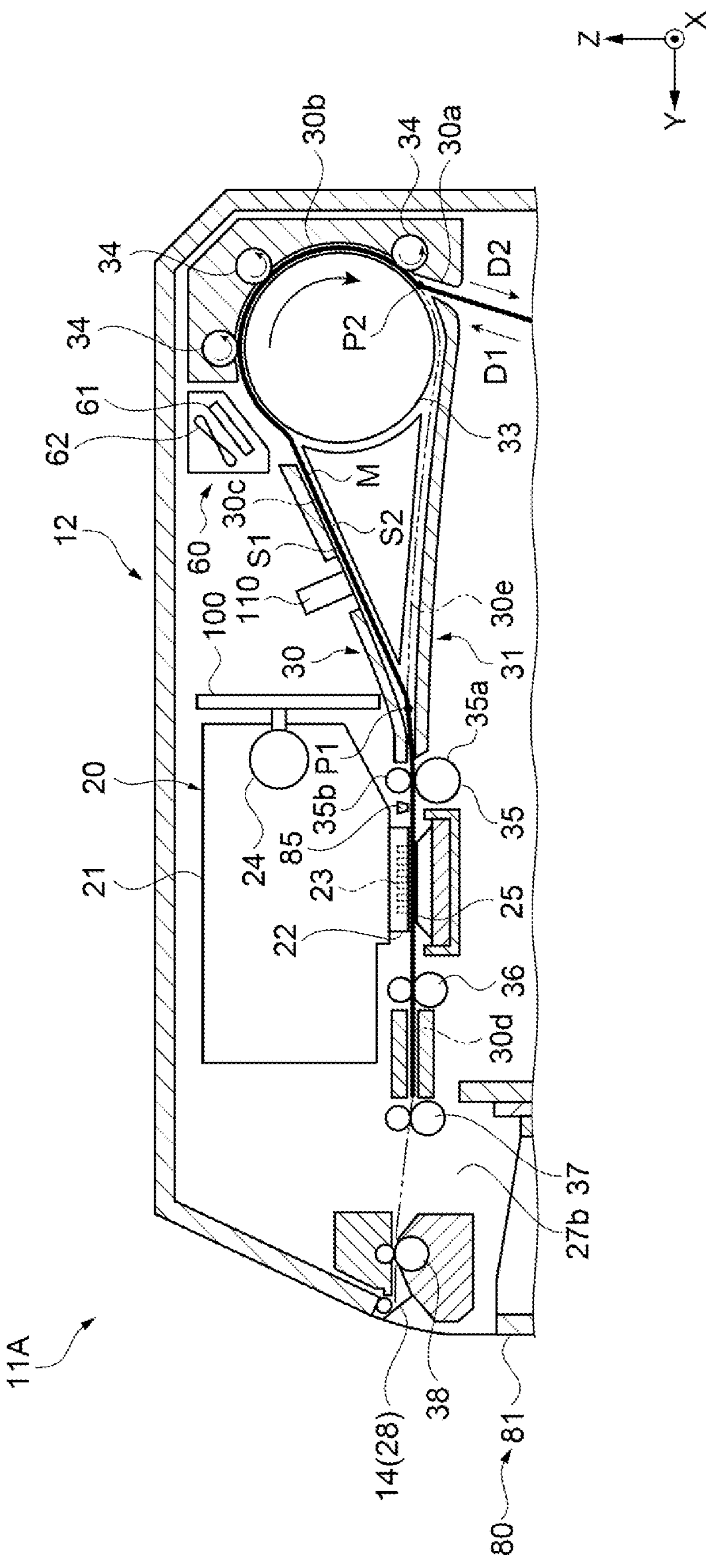
FIG. 8C is a schematic view illustrating a method of controlling the printing apparatus according to the second embodiment.

Next, as illustrated in FIG. 8C, the control unit 58 causes the medium M to be transported in the upstream direction D2 until the position of the medium M that is to be cut reaches a position that is opposed to the cutter 110. In addition, transporting the medium M is stopped such that the position of the medium M that is to be cut is stopped at a position that is opposed to the cutter 110. Then, when transporting the medium M is stopped, the cutter 110 is caused to drive to cut the medium M. This makes it possible to form a cut-sheet type medium Ma on which an image is formed.

Specifically, when the medium M on which an image is printed is cut by the cutter 110, the control unit 58 causes the intermediate roller 33 to rotate in the reverse direction. That is, the second driving device 334 is controlled to cause the intermediate roller 33 to rotate in the reverse direction. This makes it possible to transport the medium M in the upstream direction D2. At this time, the control unit 58 stops driving the first driving device 335. That is, when the medium M is cut by the cutter 110, only the intermediate roller 33 is driven to transport the medium M. With this configuration, during the cutting process by the cutter 110, a difference in transport velocity of the medium M occurring due to the upstream-side transport roller pair 35 and the intermediate roller 33 together with the driven roller 34 does not occur when the medium M is transported in the upstream direction D2, which makes it possible to accurately transport the medium M and also cut the medium M at a predetermined position.

Figure 8D:
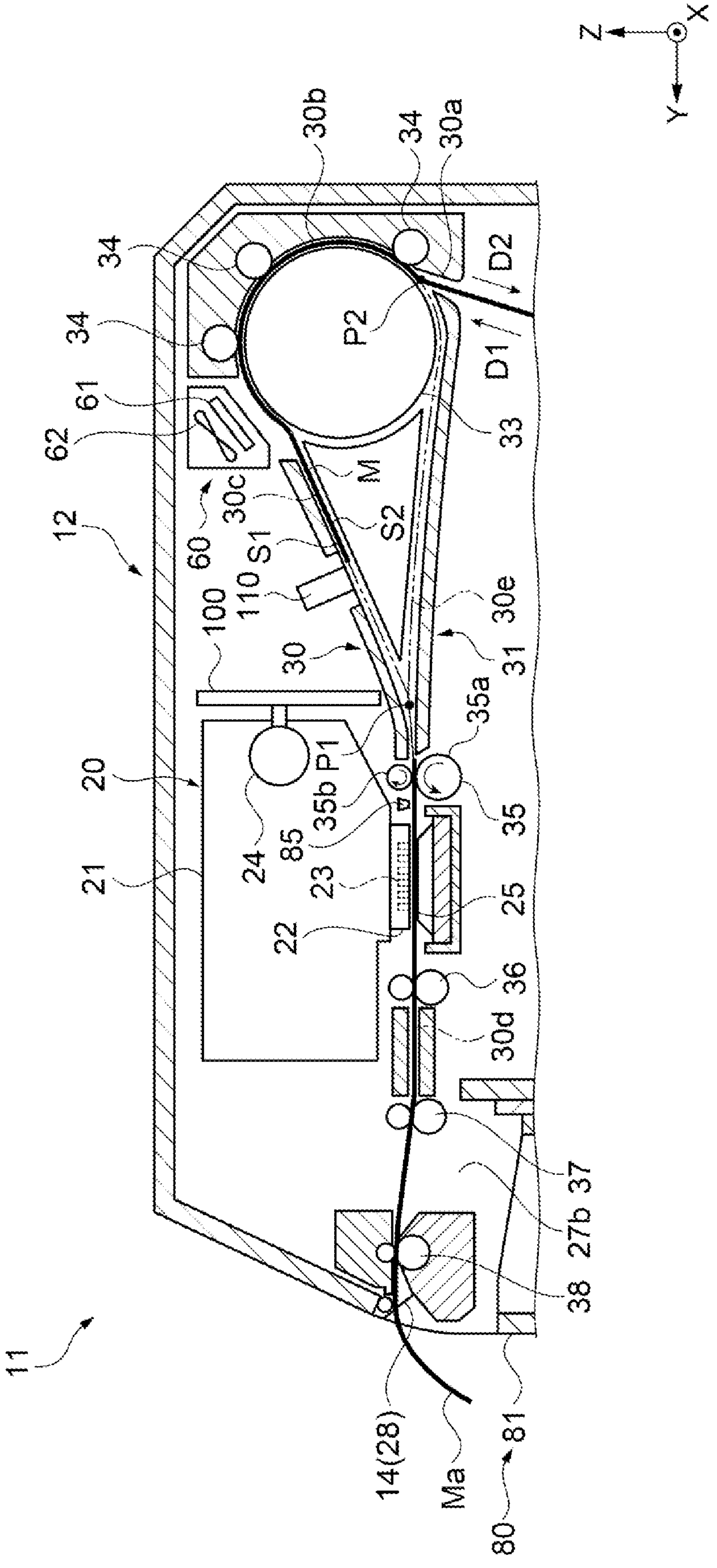
FIG. 8D is a schematic view illustrating a method of controlling the printing apparatus according to the second embodiment.

Next, as illustrated in FIG. 8D, the control unit 58 causes the medium Ma to be transported in the downstream direction D1. Specifically, the control unit 58 causes the first driving device 335 to drive, causes the upstream-side transport driving roller 35*a* to rotate in the forward direction, and causes the downstream-side first transport roller pair 36, the downstream-side second transport roller pair 37, and the downstream-side third transport roller pair 38 to rotate in the forward direction, thereby causing the medium Ma to be transported in the downstream direction D1. In addition, the transported medium Ma is discharged from the discharge port 14.

Next, description will be made of a controlling method concerning double-sided printing in which the first surface S1 of the medium Ma on which printing is performed by the printing unit 20 is inverted and printing is performed on the second surface S2 of the medium Ma.

Figure 9A:
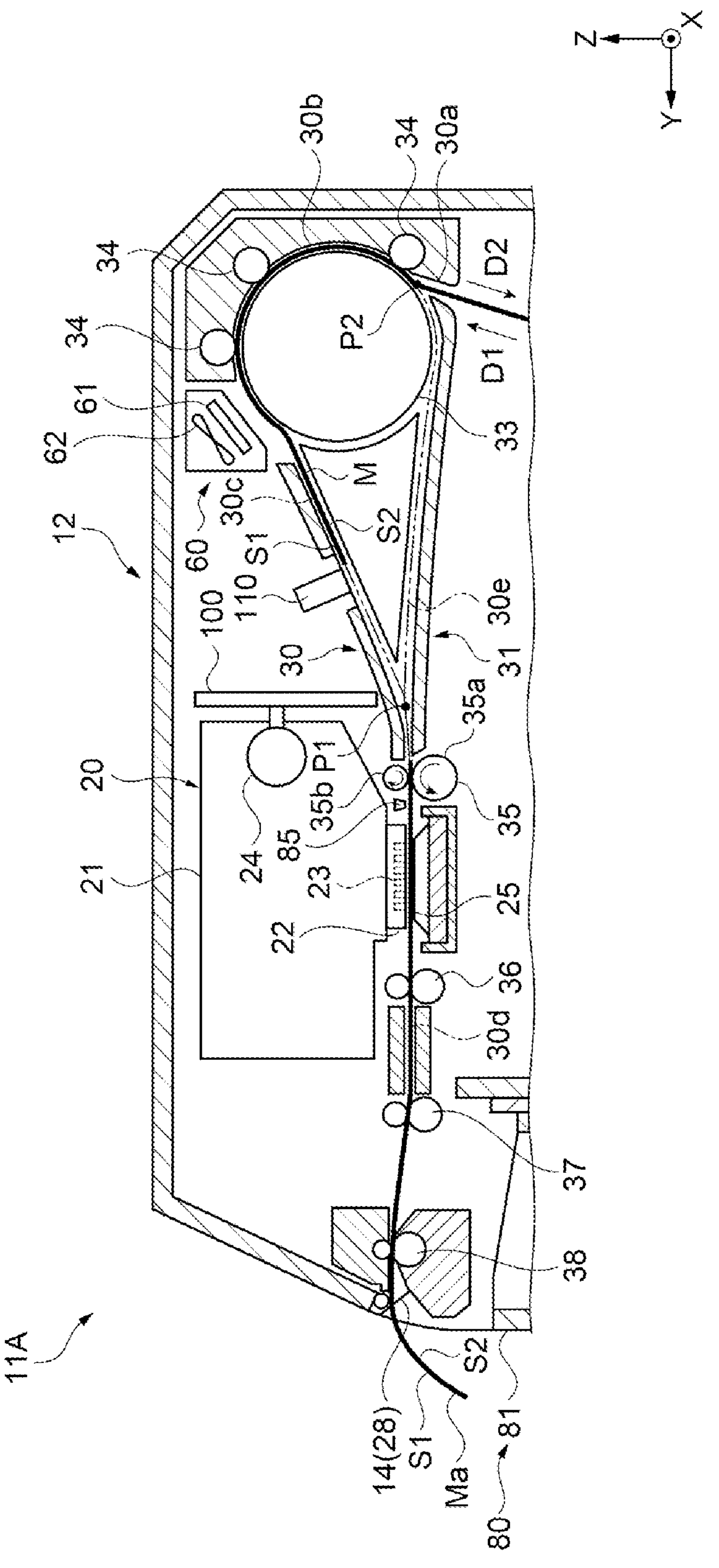
FIG. 9A is a schematic view illustrating another method of controlling the printing apparatus according to the second embodiment.

As illustrated in FIG. 9A, the control unit 58 stops energizing the coil of the electromagnetic clutch mechanism 333, causes the first driving device 335 to drive in a state in which the driving force from the second driving device 334 to the intermediate roller 33 is cut, and causes an image to be printed on the first surface S1 of the medium Ma while the medium Ma is being transported in the downstream direction D1 by the upstream-side transport roller pair 35.

Figure 9B:
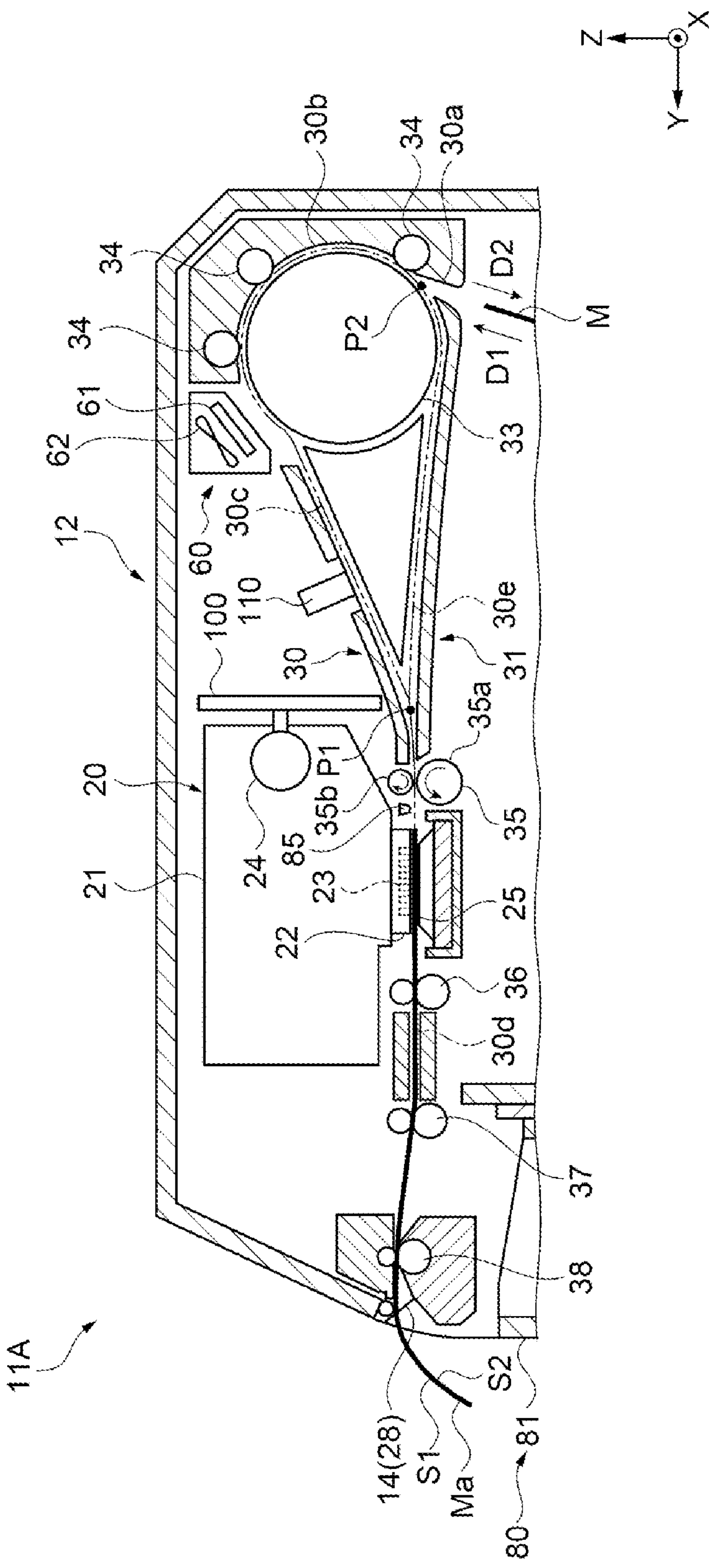
FIG. 9B is a schematic view illustrating another method of controlling the printing apparatus according to the second embodiment.

Next, as illustrated in FIG. 9B, at a point in time when printing an image on the first surface S1 of the medium Ma ends, the control unit 58 stops the upstream-side transport roller pair 35, the downstream-side first transport roller pair 36, the downstream-side second transport roller pair 37, and the downstream-side third transport roller pair 38.

In addition, the control unit 58 causes the roll-paper transporting roller pair 56, the supply roller pair 32 and the intermediate roller 33 to reversely drive and causes the medium M to be transported in the upstream direction D2 of the transport path 30 until the leading end of the medium M reaches a position disposed upstream of the merging point P2.

Figure 9C:
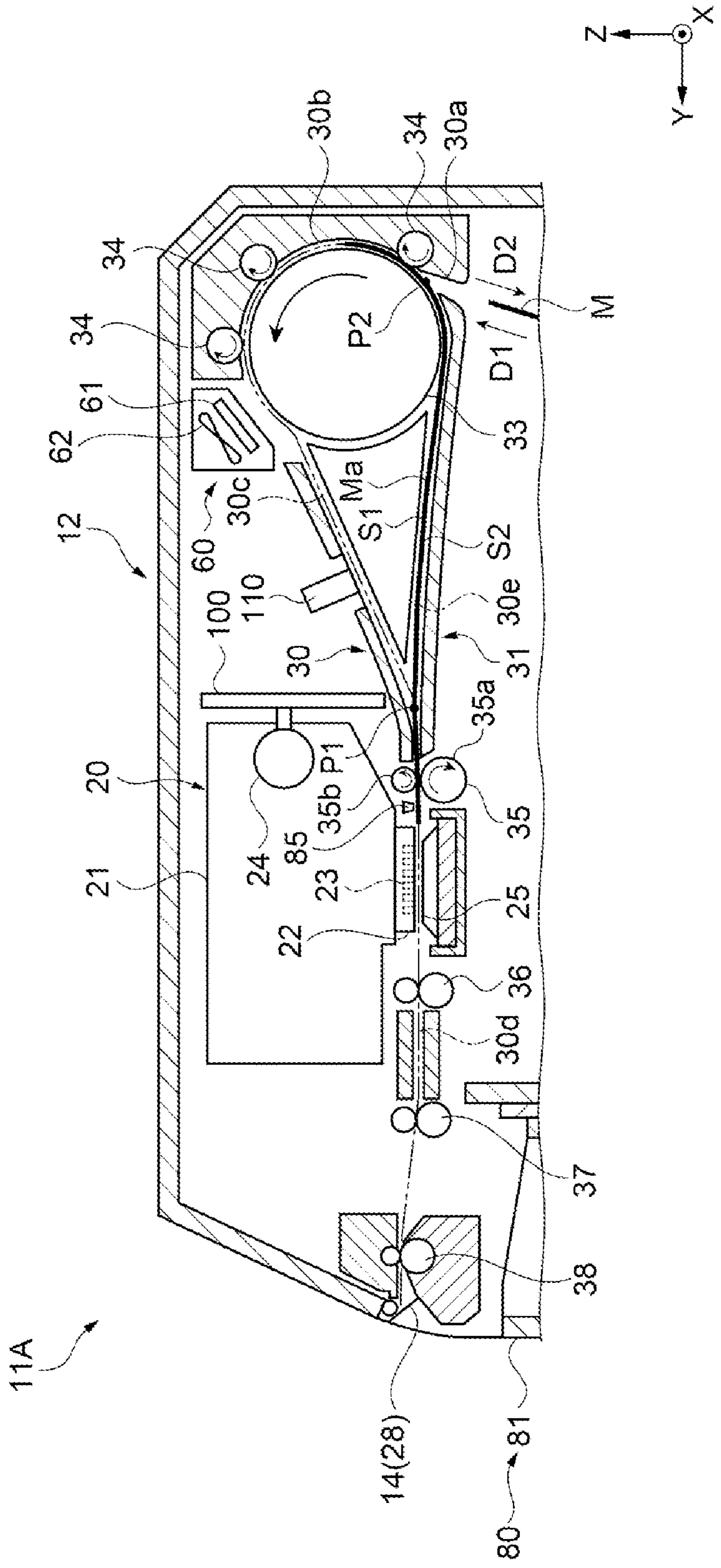
FIG. 9C is a schematic view illustrating another method of controlling the printing apparatus according to the second embodiment.

Next, as illustrated in FIG. 9C, the control unit 58 causes the upstream-side transport roller pair 35, the downstream-side first transport roller pair 36, the downstream-side second transport roller pair 37, and the downstream-side third transport roller pair 38 to reversely drive to transport the medium Ma in the upstream direction D2 of the transport path 30, thereby causing the medium Ma to be pulled into the inversion path 30*e*. On the other hand, the control unit 58 causes the intermediate roller 33 to drive in the forward direction, thereby causing the medium Ma that has been pulled into the inversion path 30*e* to be transported in the downstream direction D1 along the curved path 30*b* and the second path 30*c*. This makes it possible to cause the medium Ma to be inverted, and cause the second surface S2 of the medium Ma to face the head 22.

Figure 9D:
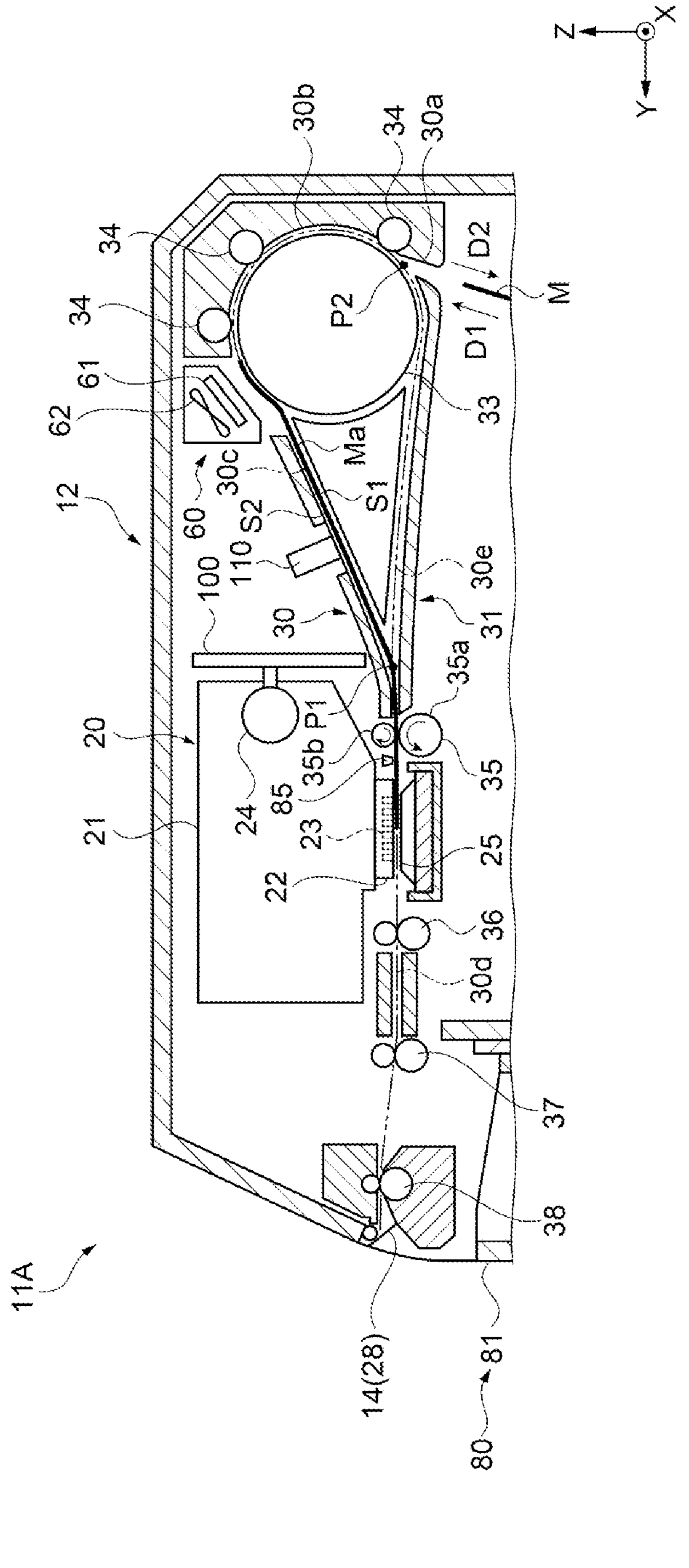
FIG. 9D is a schematic view illustrating another method of controlling the printing apparatus according to the second embodiment.

Next, when the upstream-side transport roller pair 35 nips the leading end of the medium Ma as illustrated in FIG. 9D, the control unit 58 stops energizing the coil of the electromagnetic clutch mechanism 333. With this configuration, the driving force from the second driving device 334 to the intermediate roller 33 is cut, and driving and rotating the intermediate roller 33 is stopped to bring the intermediate roller 33 together with the driven roller 34 into a freely rotatable state.

In addition, the medium Ma is transported in the downstream direction D1 in a state in which the transporting force for the medium Ma with the intermediate roller 33 and the driven roller 34 is lost and the upstream-side transport roller pair 35 nips the medium Ma. With this configuration, during printing, a difference in transport velocity of the medium Ma occurring due to the upstream-side transport roller pair 35 and the intermediate roller 33 together with the driven roller 34 does not occur, which makes it possible to accurately transport the medium Ma.

Then, ink is caused to be ejected onto the second surface S2 while the medium Ma is being caused to be transported in the downstream direction D1, to print an image. With this operation, printing is performed on both sides of the first surface S1 and the second surface S2 of the medium Ma.

After this, the medium Ma is caused to be further transported in the downstream direction D1. Then, the medium Ma is discharged from the discharge port 14.

As described above, with the present embodiment, the cutter 110 is disposed between the upstream-side transport roller pair 35 (upstream-side transport driving roller 35*a*) and the intermediate roller 33 at the transport path 30, which makes it possible to reduce the size of the printing apparatus 11A. In addition, with the control of driving the first driving device 335, the second driving device 334, and the electromagnetic clutch mechanism 333, it is possible to improve the transport property of the medium M, Ma in various types of processing modes such as at the time of performing printing on the medium M, Ma, at the time of inverting, at the time of imaging, and the like.

Note that the present embodiment employs a configuration in which the medium M on which printing has been performed is transported in the upstream direction D2 and the medium M is cut; and the cut medium Ma is transported in the downstream direction D1. However, the configuration is not limited to this. For example, it may be possible to employ a controlling configuration in which the medium M transported in the downstream direction D1 is cut, the cut medium Ma is caused to be transported in the downstream direction D1, and an image is printed on the medium Ma. With such a configuration, it is possible to obtain an effect similar to that described above.

What is claimed is:

1. A printing apparatus comprising:

a transport roller configured to transport a medium through a transport path;

a printing unit configured to perform printing on the medium transported by the transport roller through the transport path;

an intermediate roller configured to transport again, to the transport path, the medium transported through an inversion path in a reverse direction to a transport direction of the medium, to invert a front surface and a back surface of the medium, the inversion path including a branching point at which the inversion path branches from the transport path upstream of the transport roller in the transport direction, the inversion path merging with the transport path again upstream of the branching point in the transport direction;

a device disposed in the transport path and between the transport roller and the intermediate roller;

a first driving device configured to drive the transport roller; and a second driving device configured to drive the intermediate roller;

a control unit configured to control the first driving device and the second driving device, wherein the device is an imaging device or a cutter, when printing is performed on the medium by the printing unit, the control unit controls the first driving device and the second driving device to rotate the transport roller and the intermediate roller in a forward direction so as to transport the medium in the transport direction, when inverting the front suface and the back surface of the medium on which printing is performed by the printing unit, the control unit controls the first driving device and the second driving device to rotate the transport roller in a reverse direction that is a direction opposite to the forward direction and rotate the intermediate roller in the forward direction, and when the imaging device captures an image printed on the medium by the printing unit, the control unit controls the second driving device to rotate the intermediate roller in the revere direction so as to transport the medium in the reverse direction.

2. The printing apparatus according to claim 1, comprising:

an electromagnetic clutch mechanism provided at the intermediate roller and controlled by the control unit, a first driven roller disposed at a position facing the transport roller and configured to rotate following rotation of the transport roller; and a second driven roller disposed at a position facing the intermediate roller and configured to rotate following rotation of the intermediate roller, wherein, when the medium is nipped by the transport roller and the first driven roller and is also nipped by the intermediate roller and the second driven roller, when printing is performed on the medium by the printing unit, the control unit controls the electromagnetic clutch mechanism so as to cut transmission of a driving force by the second driving device to the intermediate roller.

3. A method of controlling a printing apparatus, the printing apparatus including:

a transport roller configured to transport a medium through a transport path;

a printing unit configured to perform printing on the medium transported by the transport roller;

an intermediate roller configured to transport again, to the transport path, the medium transported through an inversion path in a reverse direction to a transport direction of the medium to invert a front surface and a back surface of the medium, the inversion path including a branching point at which the inversion path branches from the transport path upstream of the transport roller in the transport direction, the inversion path merging with the transport path again upstream of the branching point in the transport direction;

an imaging device disposed in the transport path and between the transport roller and the intermediate roller;

a first driving device configured to drive the transport roller; and a second driving device configured to drive the intermediate roller, the method including:

rotating the transport roller and the intermediate roller in a forward direction to transport the medium in the transport direction when printing is performed on the medium by the printing unit;

rotating the transport roller in a reverse direction that is a direction opposite to the forward direction and rotating the intermediate roller in the forward direction when the front surface and the back surface of the medium on which printing is performed by the printing unit is inverted; and rotating the intermediate roller in the reverse direction to transport the medium in the reverse direction when the imaging device captures an image printed on the medium by the printing unit.

4. The method of controlling a printing apparatus according to claim 3, wherein the printing apparatus comprising:

an electromagnetic clutch mechanism provided at the intermediate roller;

a first driven roller disposed at a position facing the transport roller and configured to rotate following rotation of the transport roller; and a second driven roller disposed at a position facing the intermediate roller and configured to rotate following rotation of the intermediate roller, and when the medium is nipped by the transport roller and the first driven roller and is also nipped by the intermediate roller and the second driven roller when printing is performed on the medium by the printing unit, the electromagnetic clutch mechanism is used to cut transmission of a driving force by the second driving device to the intermediate roller.

5. A method of controlling a printing apparatus, the printing apparatus including:

a transport roller configured to transport a medium through a transport path;

a printing unit configured to perform printing on the medium transported by the transport roller;

an intermediate roller configured to transport again, to the transport path, the medium transported through an inversion path in a reverse direction to a transport direction of the medium to invert a front surface and a back surface of the medium, the inversion path including a branching point at which the inversion path branches from the transport path upstream of the transport roller in the transport direction, the inversion path merging with the transport path again upstream of the branching point in the transport direction;

a cutter disposed in the transport path and between the transport roller and the intermediate roller;

a first driving device configured to drive the transport roller; and a second driving device configured to drive the intermediate roller, the method including:

rotating the transport roller and the intermediate roller in a forward direction to transport the medium in the transport direction when printing is performed on the medium by the printing unit;

controlling the first driving device and the second driving device to rotate the transport roller in a reverse direction that is a direction opposite to the forward direction and rotate the intermediate roller in the forward direction when the front surface and the back surface of the medium on which printing is performed by the printing unit is inverted; and when the medium is cut by the cutter, rotating the intermediate roller in the reverse direction to transport the medium in the reverse direction.

6. The method of controlling a printing apparatus according to claim 5, wherein the printing apparatus includes:

an electromagnetic clutch mechanism provided at the intermediate roller;

a first driven roller disposed at a position facing the transport roller and configured to rotate following rotation of the transport roller; and a second driven roller disposed at a position facing the intermediate roller and configured to rotate following rotation of the intermediate roller, and when the medium is nipped by the transport roller and the first driven roller and is also nipped by the intermediate roller and the second driven roller when printing is performed on the medium by the printing unit, the electromagnetic clutch mechanism is used to cut transmission of a driving force by the second driving device to the intermediate roller.

* * * * *